(12) United States Patent
Hattori et al.

(10) Patent No.: US 6,710,832 B2
(45) Date of Patent: Mar. 23, 2004

(54) LIQUID CRYSTAL DISPLAY AND METHOD OF MANUFACTURE

(75) Inventors: Katsuji Hattori, Takarazuka (JP); Shoichi Ishihara, Katano (JP); Tsuyoshi Uemura, Kadoma (JP); Kenji Nakao, Osaka (JP); Yoshinori Tanaka, Hirakata (JP)

(73) Assignee: Matsushita Electric Industrial Co., Ltd. (JP)

( * ) Notice: Subject to any disclaimer, the term of this patent is extended or adjusted under 35 U.S.C. 154(b) by 0 days.

(21) Appl. No.: 10/003,428

(22) Filed: Dec. 6, 2001

(65) Prior Publication Data

US 2002/0085154 A1 Jul. 4, 2002

Related U.S. Application Data

(63) Continuation of application No. 09/806,230, filed on Mar. 28, 2001.

(30) Foreign Application Priority Data

| Jul. 29, 1999 | (JP) | 11-214693 |
| Sep. 8, 1999 | (JP) | 11-254388 |
| Oct. 6, 1999 | (JP) | 11-285548 |
| Feb. 18, 2000 | (JP) | 2000-040595 |

(51) Int. Cl.$^7$ ............................................ G02F 1/1337
(52) U.S. Cl. ............................................ 349/124; 349/136
(58) Field of Search ............................. 349/122, 123, 349/124, 113, 129, 130; 438/30

(56) References Cited

U.S. PATENT DOCUMENTS

| 5,422,034 A | * | 6/1995 | Hirai et al. ............. 252/299.01 |
| 5,473,455 A | * | 12/1995 | Koike et al. ............. 349/124 |
| 5,540,857 A | * | 7/1996 | Hirai et al. ............. 252/299.01 |
| 5,682,217 A | * | 10/1997 | Hisatake et al. ............. 349/123 |
| 5,796,458 A | | 8/1998 | Koike et al. |
| 5,808,717 A | * | 9/1998 | Van Aerle ............. 349/129 |
| 5,825,445 A | * | 10/1998 | Okamoto et al. ............. 349/118 |
| 5,858,274 A | * | 1/1999 | Mishina et al. ............. 252/299.4 |
| 5,928,733 A | * | 7/1999 | Yoneya et al. ............. 428/1.3 |
| 5,954,999 A | * | 9/1999 | Mishina et al. ............. 252/259.4 |
| 6,005,646 A | * | 12/1999 | Nakamura et al. ............. 349/33 |
| 6,014,194 A | * | 1/2000 | Kuo et al. ............. 349/88 |
| 6,078,375 A | * | 6/2000 | Matsumoto et al. ............. 349/123 |
| 6,157,425 A | * | 12/2000 | Kuo et al. ............. 349/88 |
| 6,400,437 B1 | * | 6/2002 | Nagata et al. ............. 349/143 |
| 6,437,844 B1 | * | 8/2002 | Hattori et al. ............. 349/129 |

FOREIGN PATENT DOCUMENTS

| JP | 63-217323 | 9/1988 |
| JP | 07-084254 | 3/1995 |
| JP | 08-095058 | 4/1996 |
| JP | 09-179123 | 7/1997 |
| JP | 09-203902 | 8/1997 |
| JP | 10-020284 | 1/1998 |
| JP | 10-142638 | 5/1998 |
| JP | 10-288784 | 10/1998 |
| JP | 11-007018 | 1/1999 |

* cited by examiner

*Primary Examiner*—Kenneth Parker
*Assistant Examiner*—David Chung
(74) *Attorney, Agent, or Firm*—Parkhurst & Wendel, L.L.P.

(57) ABSTRACT

An active matrix type liquid crystal display composed of a liquid crystal cell 124 is described. In the liquid crystal cell 124, liquid crystals at the upper and lower interfaces of a liquid crystal layer 122 inserted between an array substrate 106 having pixel electrodes 128 and an opposed substrate 105 having an opposed electrode 127 have pretilt angles opposite to each other in a positive/negative sense and are aligned in parallel with each other, forming a spray alignment. This liquid crystal display performs displaying by bend-aligning such a liquid crystal cell 124. The pixel electrodes 128 are formed on a flattening film 100 for covering switching elements 123 or wiring electrodes flat. With this arrangement, a spray to bend alignment transition can be reliably, easily caused in a short time within the liquid crystal cell pixels, so that an OCB mode liquid crystal display free from alignment defects and having high picture quality can be achieved.

7 Claims, 21 Drawing Sheets

Fig. 1
(a)
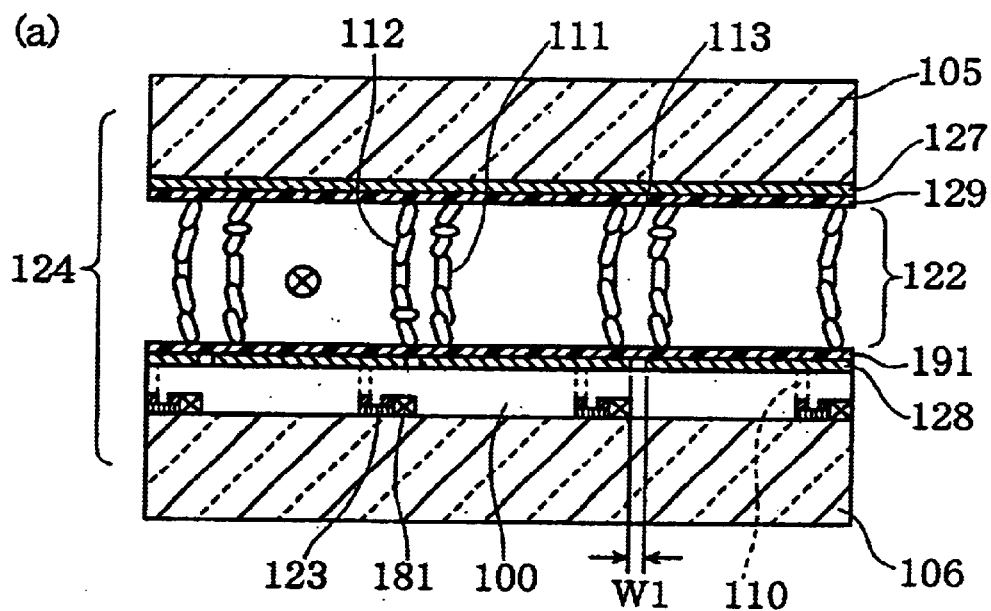
(b)
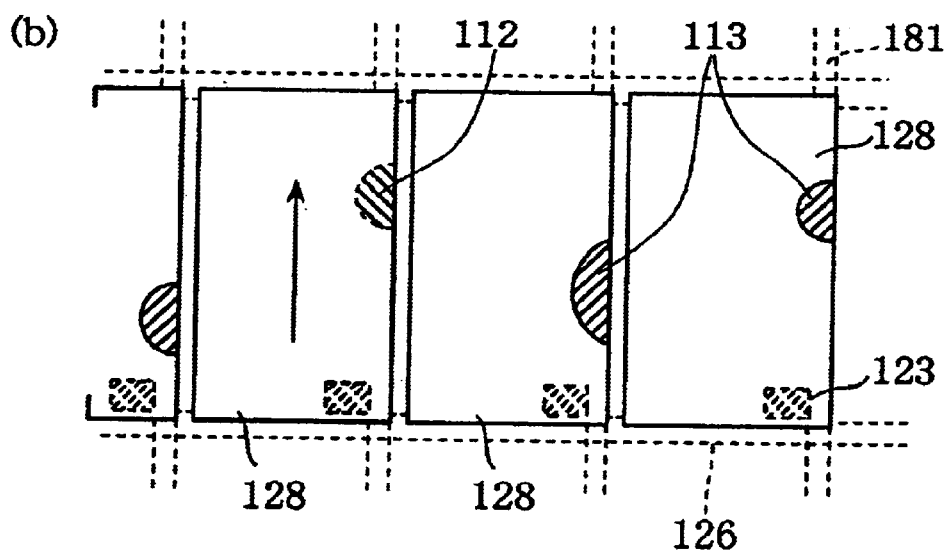
(c)
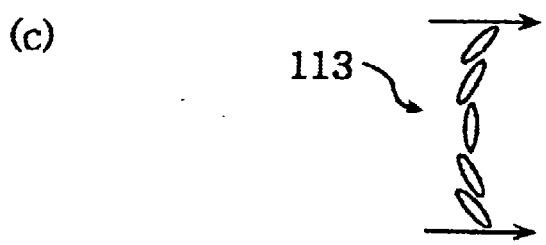

Fig. 2
(a)
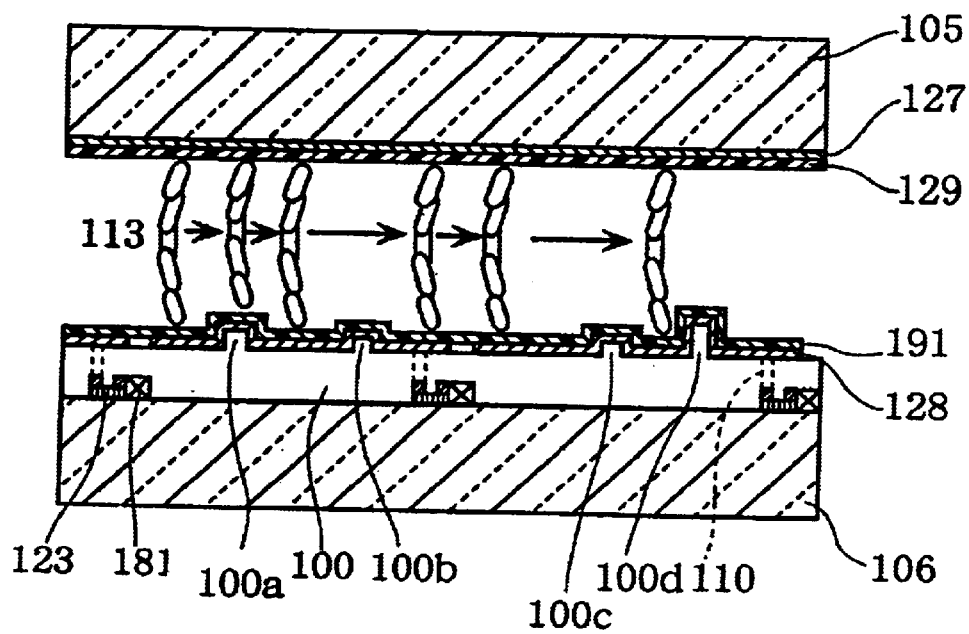
(b)
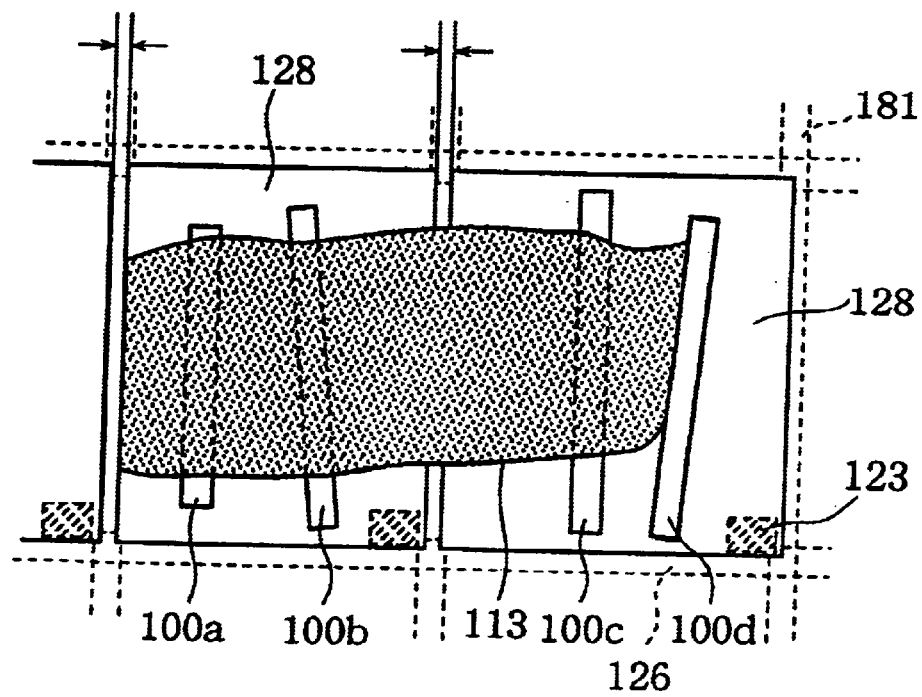

Fig. 4
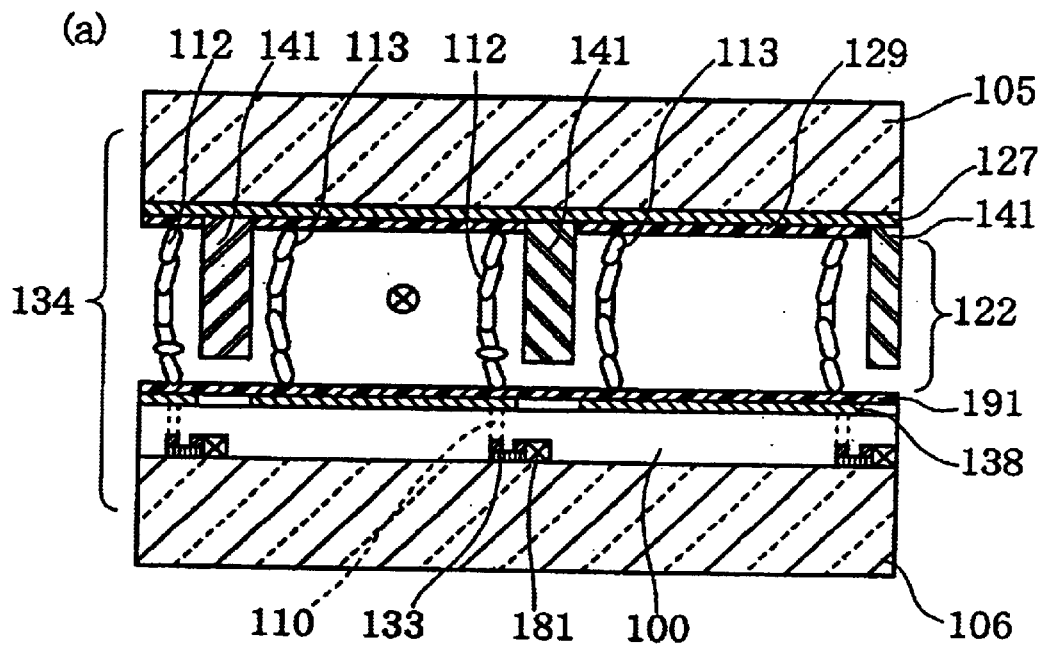
(a)
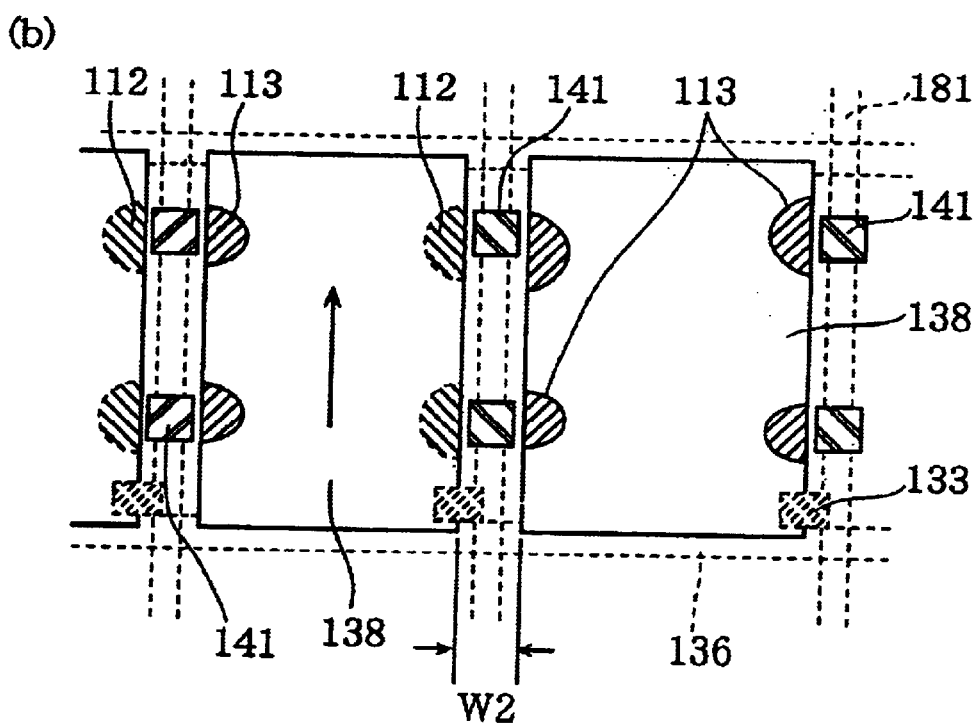
(b)

Fig. 6
(a)
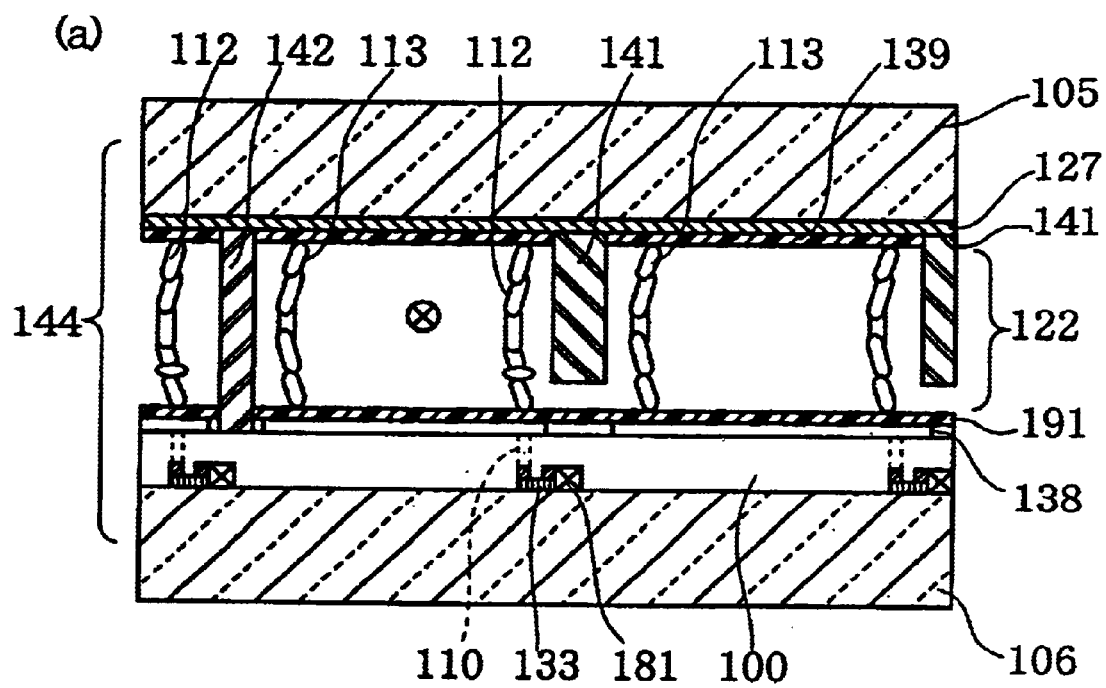
(b)
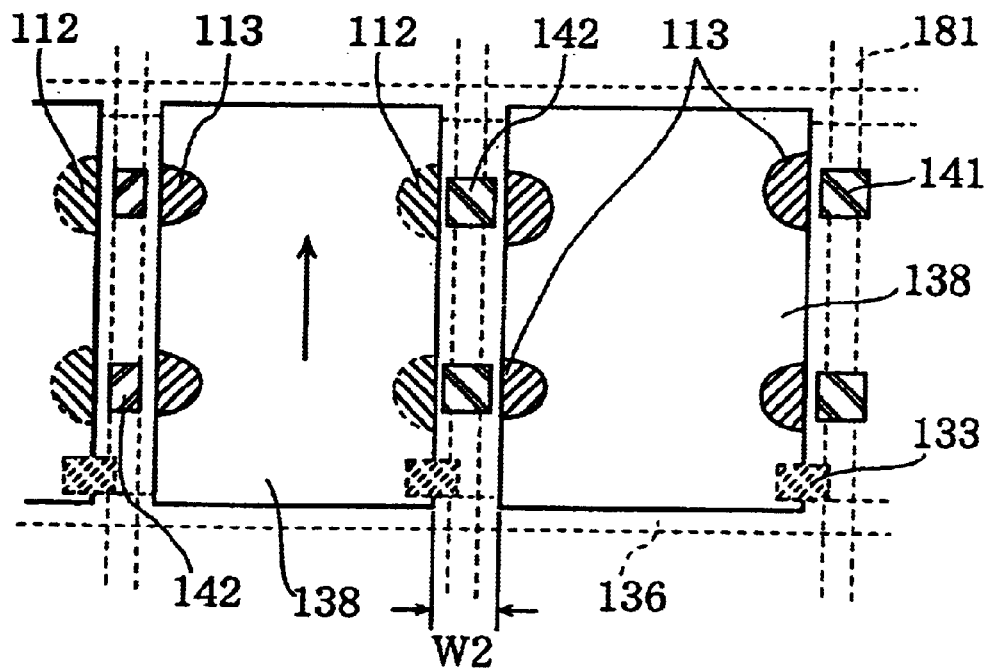

Fig. 7
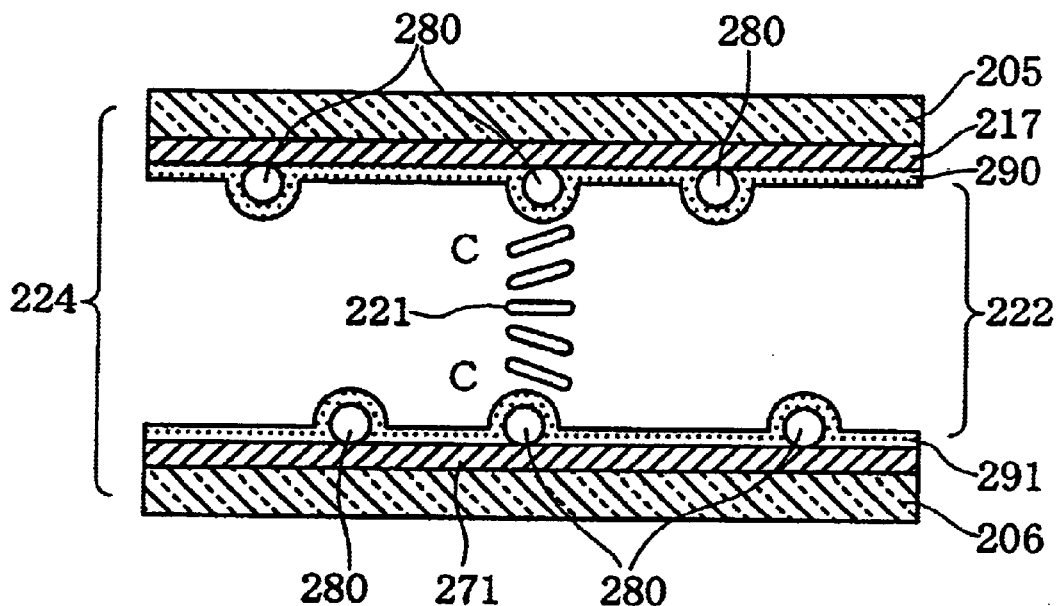
(a)
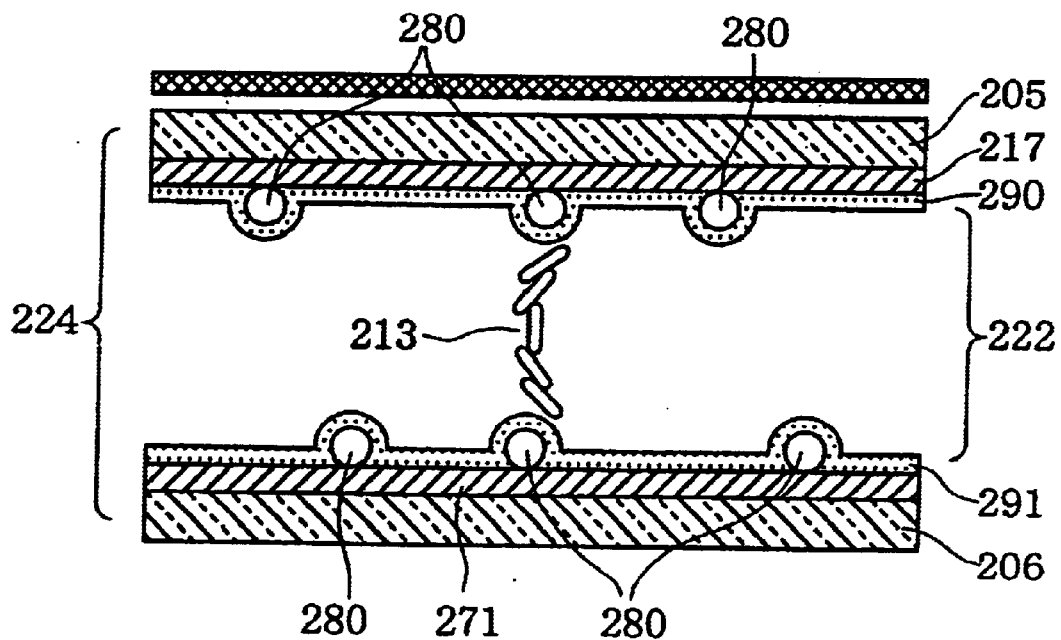
(b)

Fig. 9
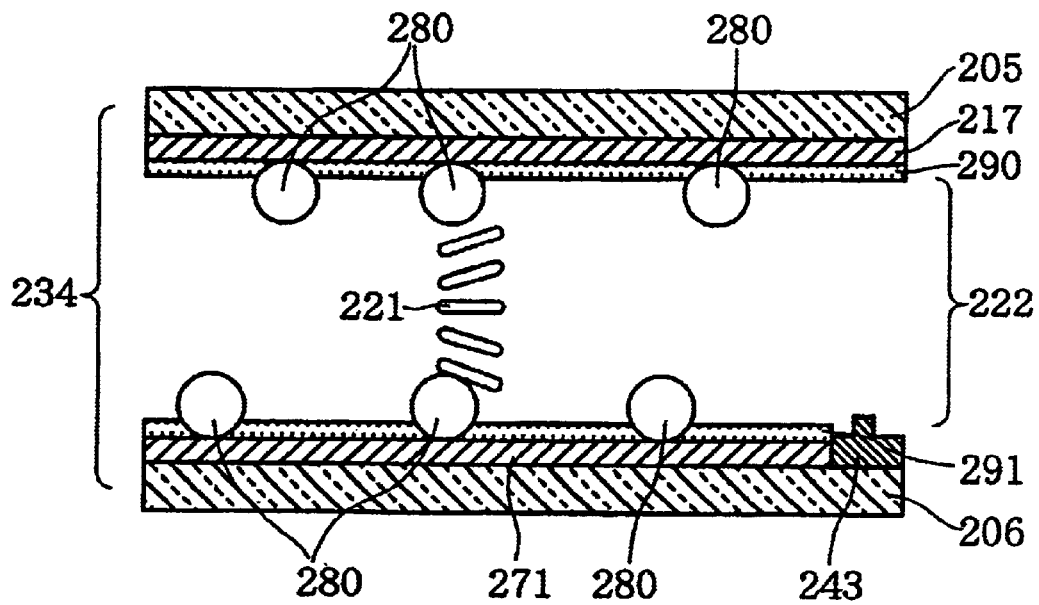
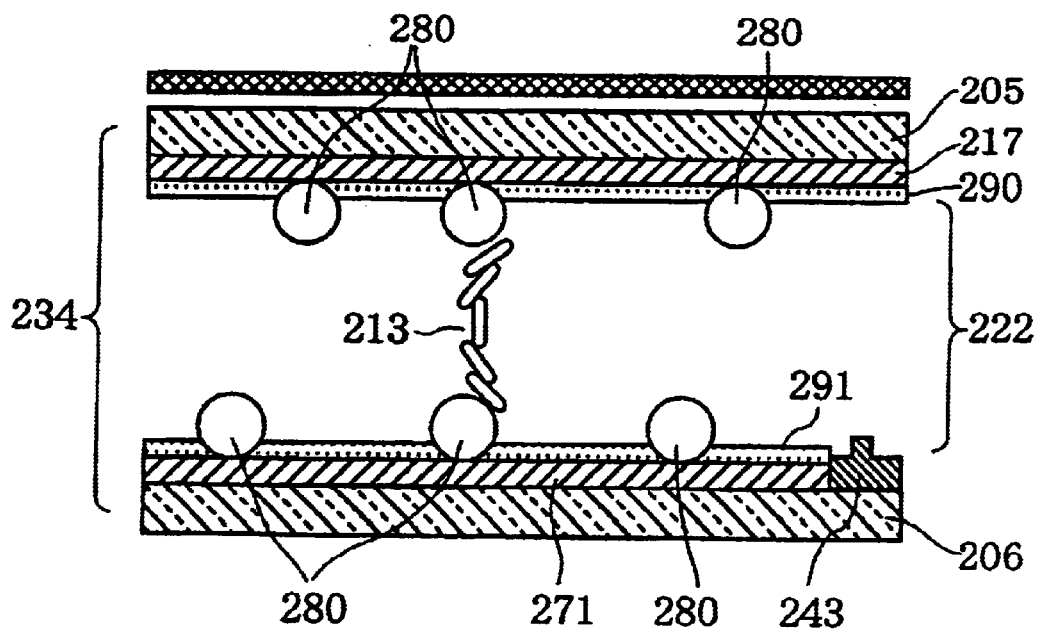

Fig. 10
(a)
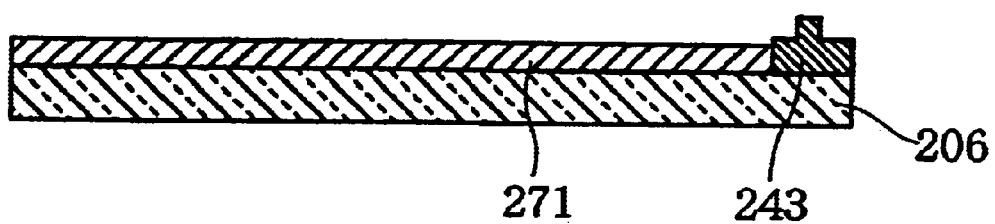
(b)
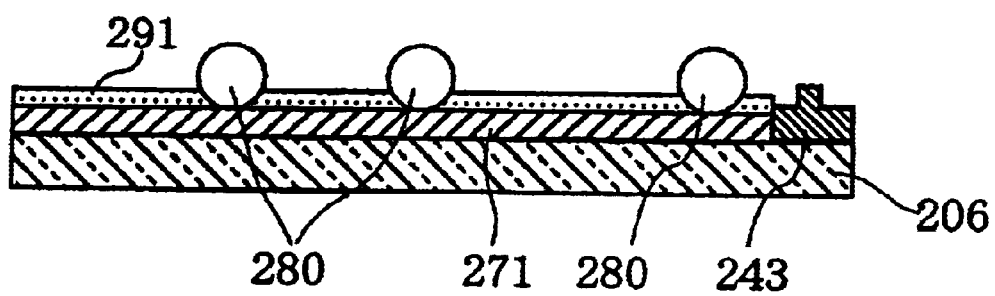

Fig. 12
(a) V=0 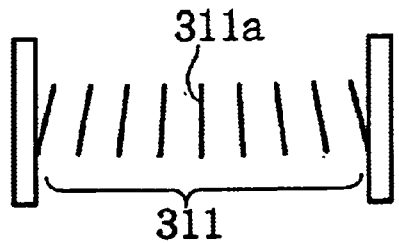
(b) V=V1 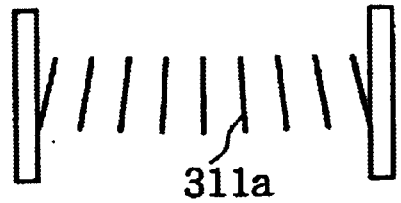
(c) V=V2 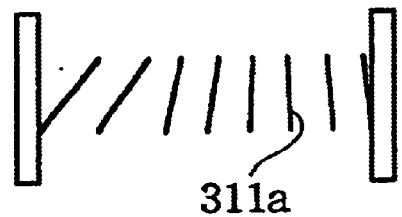
(d) V=V3 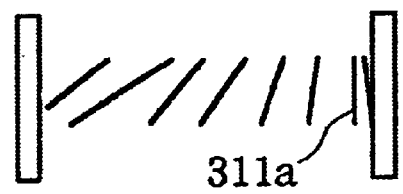
(e) V=V4 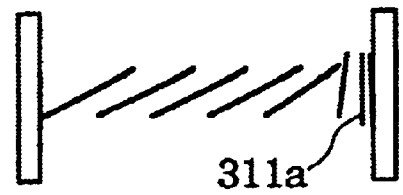
(f) V=V5 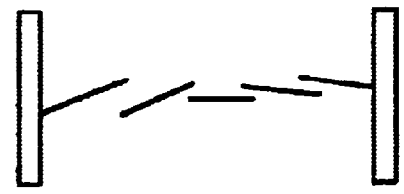
(g) V=V5 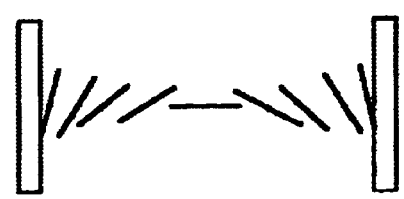

LIQUID CRYSTAL DISPLAY AND METHOD OF MANUFACTURE

This is a Rule 1.53 (b) continuation application of Ser. No. 09/806,230, filed Mar. 28, 2001.

TECHNICAL FIELD

The present invention relates to a high response speed liquid crystal display having a wide viewing angle.

BACKGROUND ART

One known type of liquid crystal displays which have been put to practical use is Twisted Nematic (TN) Mode liquid crystal displays using a nematic liquid crystal. This mode, however, has drawbacks such as low response speed and narrow viewing angles. Ferroelectric Liquid Crystals (FLC) are known as a display mode having high response speed and wide viewing angles but suffer from serious problems in shock resistance and temperature characteristics. The Polymer Dispersed Liquid Crystal Mode, which makes use of light scattering, is a rubbingless alignment display mode, yet it still needs improvements in viewing angles and its response is not fast enough.

To overcome their drawbacks, there has been proposed the Optically Compensated Bend (OCB) Mode as a display mode having fast response and wide viewing angles (Japanese Patent Publication (KOKAI) No. 7-84254 (1995)).

FIG. 21 shows a conceptual structural sectional view of the pixel region of an OCB mode liquid crystal display.

As shown in FIG. 21, this liquid crystal display of the OCB mode has alignment layers 19 which are oriented in a certain direction; a liquid crystal cell 14 in which a bend alignment or a bend alignment including a twisted alignment is generated at the center of the cell 14 by voltage application; and a phase compensator 3 for optical phase compensation for achieving low voltage actuation and enlarged viewing angles. Regarding performance, the OCB mode can provide an active matrix type liquid crystal display having a wide viewing angle and high response speed. In addition, it has the high potential of finding wide applications as a transmissive or reflective type liquid crystal display.

The above liquid crystal display is formed as follows. The alignment layers 19 are attached to the inner surface of an array substrate 6 on which switching elements 20 or the like each connected to an pixel electrode 18 for actuating a pixel region is placed and to the inner surface of an opposed substrate 5 having an posed electrode 17 thereon. These alignment layers 19 have undergone alignment treatment so as to be parallel to each other and have pretilt angles which are about several to ten degrees, being opposite to each other in a positive/negative sense. A nematic liquid crystal having positive dielectric anisotropy is inserted between the alignment layers 19 to form a liquid crystal layer 12. Accordingly, there is formed a spray alignment 11 composed of an alignment region in which liquid crystal molecules are diagonally spread in a vertically symmetrical manner when no voltage is applied.

Then, a voltage higher than the critical transition voltage is applied across the above electrodes, whereby transition is caused to form the bend alignment 13 composed of an alignment region in which the liquid crystal molecules at the center are raised upright or the liquid crystal molecules including twisted alignment are raised in a twisted manner, as shown in FIG. 21(b) and this region is extended.

At least one polarizer and at least one phase compensator are disposed on the outer sides of the upper and lower substrates, extending in a specified axial direction. Specifically, there are provided polarizers 1, 2 and the phase compensator 3 for optically compensating for the bend alignment cell and lowering voltage in order to attain sufficient contrast and an increased view angle.

After the transition of the whole pixels, driving signal voltage is varied to change the degree of the bend alignment state of the liquid crystal molecules, thereby changing the phase difference to be utilized for motion display. Therefore, in the liquid crystal display of the OCB mode, it is necessary to develop transition cores for transition from the spray alignment to the bend alignment to bring the pixels into an uniform bend alignment state and to cause such transition throughout the TFT panel pixel region without fail. In reality, it is not easy to develop transition cores without fail.

When observing the above pixel region with a microscope, it has been found that transition cores develop around spacers which are provided so as to scatter for gap formation or that transition cores develop around source lines and gate lines wired along the pixel electrodes, but developing positions are not fixed. In some cases, transition cores are not developed at all. In this case, the resultant panel has alignment defects and visible defects.

As an attempt to promote the above transition, there has been proposed a method in which a voltage higher than the critical transition voltage is applied across the opposed electrode and pixel electrodes of the liquid crystal cell. However, the applied voltage and the time required for voltage application, which are necessary for the transition, vary considerably depending on liquid crystal materials. With some liquid crystal materials, a time ranging from tens of seconds to several minutes is required for applying about 20 V across the facing electrodes in order to cause a transition in a TFT liquid crystal panel of the OCB mode. This case is not practical not only in view of the wait time taken for starting displaying but also in view of the power consumption of the liquid crystal display and the reliability of the driving unit.

In such circumstances, there have been strong demands to a technique for enabling a reliable transition of alignment within all of hundreds of thousands of pixels in the display panel of an OCB mode liquid crystal display.

Disclosure of the Invention

A series of inventions has been made taking the present status of the technology described above into account. The prime object of the inventions is therefore to provide a liquid crystal display which has no display defects and high response speed and is therefore suitable for displaying moving pictures and which also has a wide viewing angle, since it can cause alignment transition with substantial reliability and complete it in an extremely short time. More particularly, the object of the inventions is to provide a bend alignment type liquid crystal display which has high response speed and is therefore suitable for displaying moving pictures, since it can cause bend alignment transition with substantial reliability and complete it in an extremely short time.

The series of inventions is based on the same or similar concepts, but embodied by different examples. In the present specification, these inventions are classified according to analogy into a first invention group, a second invention group, a third invention group, a fourth invention group and a fifth invention group. The contents of each group (i.e., each invention group) will be hereinafter described in order.

First Invention Group

The first invention group is associated with a liquid crystal display wherein where the alignment state of a liquid crystal to which no voltage is applied is defined as an alignment state 1 and the alignment state of the liquid crystal used for performing displaying is defined as an alignment state 2, the alignment state 1 differs from the alignment state 2; and wherein for easy, reliable transition from the alignment state 1 to the alignment state 2, the unevenness of a surface of a substrate is flattened and an interface of a liquid crystal layer is flattened.

In liquid crystal displays having a conventional active matrix substrate, significant irregularities are usually present on the substrates. This is due to the process in which the top layer, that is, an insulating layer having the greatest level difference is removed to expose the pixel electrodes. Level differences are also caused by source wiring and gate wiring positioned around the pixels. Thus, the presence of level differences is usual for active matrix substrates.

In conventionally used TN type liquid crystal displays, the presence of level differences causes alignment disturbance at their positions, resulting in light leakage. To solve this problem, it is necessary to seal the regions where light leakage occurs with a black matrix, which however causes the problem of decreasing brightness. As an attempt to overcome the alignment disturbance and light leakage, there has been proposed one technique according to which a resin layer is formed on the substrate having irregularities thereon and pixel electrodes are then formed on the resin layer to flatten the device.

In liquid crystal displays in which the alignment state when no voltage is applied differs from the alignment state when displaying can be performed (e.g., OCB mode liquid crystal displays), "transition" operation is necessary for shifting to the alignment state for displaying.

Since OCB mode liquid crystal displays have a parallel alignment different from that of TN type liquid crystal displays, they do not suffer from the problem of alignment disturbance such as seen in TN type liquid crystal displays. However, the inventors have newly found that level differences adversely affect the transition.

In OCB mode liquid crystal displays, transition is carried out by applying transition voltage. At that time, the bend alignment develops from transition cores and this alignment state is expanding. It has, however, been found that the development of the bend alignment ceases when it has reached an irregular region in the substrate and particularly a region where the substrate is raised and therefore the liquid crystal layer becomes thin. The bend alignment usually develops along a defect. In a region where the liquid crystal layer is thin, the defect is intermittent and therefore the development stops. In many cases, such a defect is found in a boundary between two types of spray alignment states which differ from each other in the tilting direction of the liquid crystal molecules tilted with respect to the direction of cell thickness.

The inventors have also found that when transition is not completed with a voltage having a specified transition waveform, leaving some pixels in the spray alignment state, a transition to the bend alignment gradually occurs due to normal display driving operation which is performed later.

Based on the above findings, the inventors have accomplished a liquid crystal display such as OCB mode liquid crystal displays wherein where the alignment state of a liquid crystal to which no voltage is applied is defined as an alignment state 1 and the alignment state of the liquid crystal used for performing displaying is defined as an alignment state 2, the alignment state 1 differs from the alignment state 2; and wherein for easy, reliable transition, the unevenness of a surface of a substrate is flattened and an interface of a liquid crystal layer is flattened.

More specifically, a first aspect of the invention is a liquid crystal display having a pair of substrates and a liquid crystal layer sandwiched between the pair of substrates, wherein where the alignment state of a liquid crystal when no voltage is applied to the liquid crystal layer is defined as an alignment state 1 and the alignment state of the liquid crystal used for performing displaying is defined as an alignment state 2, the alignment state 1 differs from the alignment state 2; and wherein the interface between the liquid crystal layer and at least either one of the pair of substrates is flattened.

With the above arrangement, irregularities in the interface between the liquid crystal layer and the substrate can be reduced so that the transition from the alignment state 1 to the alignment state 2 can be easily and reliably carried out.

A second aspect of the invention is a liquid crystal display constructed according to the first aspect of the invention, in which either of the above pair of substrates is an active matrix substrate. According to the above arrangement, although the active matrix substrate has source wiring, gate wiring and the like formed around the pixels and therefore has great level differences, such a substrate is flattened to have a flat configuration so that the transition from the alignment state 1 to the alignment state 2 can be easily and reliably carried out.

A third aspect of the invention is a liquid crystal display constructed according to the first aspect of the invention, wherein the interface is flattened by a flattening film composed of a resin layer.

A fourth aspect of the invention is a liquid crystal display constructed according to the third aspect of the invention, wherein electrodes are formed on at least part of the flattening film.

A fifth aspect of the invention is a liquid crystal display constructed according to the first aspect of the invention, wherein the alignment state 1 is a spray alignment state and the alignment state 2 is a bend alignment state.

The above arrangements make it possible to provide OCB mode liquid crystal displays in which easy and reliable transition is enabled.

A sixth aspect of the invention is a liquid crystal display constructed according to the first aspect of the invention, wherein the level differences of irregularities on the substrates are 1 $\mu$m or less.

A seventh aspect of the invention is a liquid crystal display constructed according to the first aspect of the invention, wherein the level differences of irregularities on the substrates are 0.5 $\mu$m or less.

By limiting the level differences of the irregularities on the substrates to 1 $\mu$m or less or more preferably to 0.5 $\mu$m or less, the transition from the alignment state 1 to the alignment state 2 can be easily, reliably performed.

An eighth aspect of the invention is a liquid crystal display constructed according to the second aspect of the invention, wherein the active matrix substrate has a plurality of pixel electrodes and the spacing between the pixel electrodes is within the range of from 1 $\mu$m to 10 $\mu$m.

A ninth aspect of the invention is a liquid crystal display constructed according to the second aspect of the invention, wherein the active matrix substrate has a plurality of pixel electrodes and the spacing between the pixel electrodes is within the range of from 1 µm to 5 µm.

As described above, the preferred spacing between the pixel electrodes is within the range of from 1 µm to 10 µm or, more preferably, within the range of from 1 µm to 5 µm, which makes it easy to reliably carry out the transition from the alignment state 1 to the alignment state 2.

A tenth aspect of the invention is a liquid crystal display constructed according to the eighth aspect of the invention, wherein at least part of the pixel electrodes is higher than the average height of the pixel electrodes. The higher part of the pixel electrodes facilitates the development of transition cores.

An 11th aspect of the invention is a liquid crystal display constructed according to the eighth aspect of the invention, wherein a voltage is applied across the pixel electrodes and an opposed electrode formed on the other one of the pair of substrates, thereby transiting the alignment state of the liquid crystal layer to a bend alignment to perform displaying in the condition after the transition.

Second Invention Group

A 12th aspect of the invention is an active matrix type liquid crystal display wherein a liquid crystal layer is sandwiched between an array substrate having pixel electrodes and an opposed substrate having an opposed electrode and the liquid crystal layer is oriented in a bend alignment thereby performing displaying, and wherein conductive formation members, which are electrically conducted to the opposed electrode but electrically insulated from the array substrate, are formed on the opposed substrate.

A 13th aspect of the invention is a liquid crystal display constructed according to the 12th aspect of the invention, wherein the conductive formation members are placed in the space between every adjacent pixel electrodes so as to be electrically insulated from the array substrate.

With the above arrangements, a diagonal strong electric field is developed and applied across the conductive formation members and the pixel electrodes, causing electric field distortion which brings the liquid crystal molecules in the liquid crystal layer positioned in the vicinity of the conductive formation members and in the vicinity of the pixel electrodes into a b-sprayed alignment state so that the energy of the distortion of the liquid crystal molecules becomes greater than that of their surroundings. In this condition, a high voltage is applied across the pixel electrodes and the opposed electrode thereby further providing energy so that transition cores of the bend alignment can be developed and the region of the bend alignment can be extended.

A 14th aspect of the invention is a liquid crystal display constructed according to the 12th aspect of the invention, wherein the pixel electrodes are positioned on a flattening film formed on the array substrate.

This arrangement further makes it possible to easily and reliably carry out the transition from the spray alignment to the bend alignment.

A 15th aspect of the invention is a liquid crystal display constructed according to the 14th aspect of the invention, wherein the level differences of irregularities on the flattening film are 1 µm or less.

A 16th aspect of the invention is a liquid crystal display constructed according to the 14th aspect of the invention, wherein the level differences of irregularities on the flattening film are 0.5 µm or less.

By imposing such level difference limitation that the level differences of irregularities on the substrate are 1 µm or less or more preferably 0.5 µm or less, the transition from the spray alignment state to the bend alignment state can be easily, reliably performed.

A 17th aspect of the invention is a liquid crystal display constructed according to the 12th aspect of the invention, wherein the array substrate has a plurality of pixel electrodes and the spacing between the pixel electrodes is within the range of from 1 µm to 10 µm.

An 18th aspect of the invention is a liquid crystal display constructed according to the 12th aspect of the invention, wherein the array substrate has a plurality of pixel electrodes and the spacing between the pixel electrodes is within the range of from 1 µm to 5 µm.

By limiting the spacing between the pixel electrodes to 1 µm to 10 µm or more preferably 1 µm to 5 µm, the transition from the spray alignment to the bend alignment can be developed in a better condition.

A 19th aspect of the invention is a liquid crystal display constructed according to the 12th aspect of the invention, wherein the conductive formation members are covered with an insulating material.

With the above arrangement, the pixel electrodes and the opposed electrode are electrically insulated from each other since the conductive formation members have an electric insulation relationship with the array substrate, so that a liquid crystal display having excellent performance can be attained.

A 20th aspect of the invention is a liquid crystal display constructed according to the 12th aspect of the invention, wherein the height of the conductive formation members is smaller than the gap between the array substrate and the opposed substrate A 21st aspect of the invention is a liquid crystal display constructed according to the 12th aspect of the invention, wherein the conductive formation members are spacers for maintaining the gap between the array substrate and the opposed substrate to be constant.

The above arrangements actualize a spacer-less process which does not need provision of ordinary spacers so that the manufacturing process can be simplified. Further, the arrangements make it possible to achieve uniform displaying so that a liquid crystal display excellent in displaying performance can be obtained.

A 22nd aspect of the invention is a liquid crystal display constructed according to the 12th aspect of the invention, wherein a voltage is applied across the pixel electrodes and the opposed electrode to transit the alignment state of the liquid crystal layer to the bend alignment to perform displaying in the condition after the transition.

Third Invention Group

A 23rd aspect of the invention is a liquid crystal display which comprises a pair of substrates having electrodes and a liquid crystal layer sandwiched between the pair of substrates; wherein liquid crystal molecules in the liquid crystal layer are oriented in a bend alignment to perform displaying; and wherein at least one conductive particle having a diameter smaller than the gap between the pair of substrates is placed on the electrode surface of at least either one of the substrates.

A 24th aspect of the invention is a liquid crystal display constructed according to the 23rd aspect of the invention, wherein the conductive particle is placed on the electrode surface of at least either one of the substrates so as to be positioned under an alignment layer.

A 25th aspect of the invention is a liquid crystal display constructed according to the 23rd aspect of the invention, wherein the conductive particle is placed on the electrode surface of at least either one of the substrates so as to be mixed with and dispersed in an alignment layer.

With the above arrangements, electrical field concentration occurring in the conductive particle causes a change in alignment in the neighborhood of the conductive particle, creating a transition core for a bend alignment with the conductive particle serving as a base point, and the bend alignment region is expanded by high voltage being continuously applied. Thus, the transition can be reliably and readily carried out to obtain an OCB display mode liquid crystal display composed of a liquid crystal cell free from display defects and having high response speed, a wide viewing angle and high picture quality.

A 26th aspect of the invention is a liquid crystal display constructed according to the 23rd aspect of the invention, wherein one of the pair of substrates has a pixel electrode and a switching element for every pixel.

A 27th aspect of the invention is a liquid crystal display constructed according to the 26th aspect of the invention, wherein the pixel electrodes are formed on a flattening film for covering the switching elements or wiring electrodes flat.

This arrangement further facilitates the transition to the bend alignment.

A 28th aspect of the invention is a liquid crystal display constructed according to the 23rd aspect of the invention, wherein a voltage is applied across the electrodes to transit the alignment state of the liquid crystal layer to the bend alignment to perform displaying in the condition after the transition.

A 29th aspect of the invention is a liquid crystal display constructed according to the 23rd aspect of the invention, wherein the conductive particle is a resin particle or an inorganic material particle the surface of which is coated with a conductive thin film.

A 30th aspect of the invention is a liquid crystal display constructed according to the 23rd aspect of the invention, wherein the diameter of the conductive particle is within the range of from one hundredth the gap between the substrates to one half the gap between the substrates.

The reason why such a limitation is imposed is that if the diameter of the conductive particle is smaller than one hundredth the substrate gap, the transition promoting effect decreases and if the diameter of the conductive particle is larger than one half the substrate gap, the pair of substrates are likely to electrically contact with each other.

A 31st aspect of the invention is a method of producing a liquid crystal display which comprises a pair of substrates having electrodes and a liquid crystal layer sandwiched between the pair of substrates and wherein displaying is performed by orienting liquid crystal molecules within the liquid crystal layer in a bend alignment, the method comprising:

a dispersion step of dispersedly securing a conductive particle having a diameter smaller than the gap between the substrates to the electrode surface of at least either one of the substrates; and an alignment layer formation step of forming an alignment layer by applying an alignment film material to the electrodes and baking it.

A 32nd aspect of the invention is a method of manufacturing a liquid crystal display which has a pair of substrates having electrodes and a liquid crystal layer sandwiched between the pair of substrates and wherein displaying is performed by orienting liquid crystal molecules within the liquid crystal layer in a bend alignment, the method comprising an alignment layer formation step of disposing a conductive particle in a mixed and dispersed manner by applying a material to the electrode surface of at least one of the substrates and baking it, the material containing the conductive particle which has a diameter smaller than the gap between the substrates and is mixed with and dispersed in the alignment film material.

These methods obviate the need for a photolitho-process for forming projections, thereby simplifying the manufacturing method and reducing manufacturing cost. Further, these methods make it possible to reliably, quickly cause a transition and to obtain an OCB display mode liquid crystal display composed of a liquid crystal cell free from display defects and having high response speed, a wide viewing angle and high picture quality.

Fourth Invention Group

A 33rd aspect of the invention is a liquid crystal display which has a pair of substrates including electrodes and a liquid crystal layer sandwiched between the pair of substrates; wherein the liquid crystal layer is oriented in a spray alignment; and wherein the surfaces of alignment layers formed on the surfaces of the electrodes each have an irregular configuration.

A 34th aspect of the invention is a liquid crystal display constructed according to the 33rd aspect of the invention, wherein the irregular configuration is a configuration formed by regions changing in thickness in the alignment layers.

A 35th aspect of the invention is a liquid crystal display constructed according to the 33rd aspect of the invention, wherein the alignment layers are formed by letterpress printing.

With the above arrangements, the pretilt angle of liquid crystal molecules within the liquid crystal layer becomes spuriously increased owing to the alignment layer regions different in thickness, so that a shift to the bend alignment can be quickly carried out during an initialization process for a spray to bend transition.

A 36th aspect of the invention is a liquid crystal display constructed according to the 33rd aspect of the invention, wherein either one of the pair of substrates is an array substrate having pixel electrodes formed thereon, a flattening film is formed on the array substrate, and the flattening film has an irregular configuration.

By virtue of the above arrangement, the liquid crystal molecules within the liquid crystal layer are brought into an alignment state in which the liquid crystal molecules have various pretilt angles with respect to the surface of the alignment layer which has an irregular configuration resulting from the provision of the irregular flattening film, so that a quick transition to the bend alignment can be performed during an initialization process for a spray to bend transition.

A 37th aspect of the invention is a liquid crystal display constructed according to the 33rd aspect of the invention, wherein either of the substrates is a reflective substrate and the reflecting surface of this substrate has an irregular configuration.

By virtue of the above arrangement, the liquid crystal molecules within the liquid crystal layer are brought into an alignment state in which the liquid crystal molecules have various pretilt angles with respect to the surface of the alignment layer which has an irregular configuration resulting from the provision of the irregular reflective film, so that a quick transition to the bend alignment can be performed during an initialization process for a spray to bend transition.

A 38th aspect of the invention is a liquid crystal display constructed according to the 33rd aspect of the invention, wherein a voltage is applied across the electrodes to transit the alignment of the liquid crystal layer to a bend alignment to perform displaying in the condition after the transition.

A 39th aspect of the invention is a method of manufacturing a liquid crystal display which comprise a pair of substrates having electrodes and a liquid crystal layer sandwiched between the pair of substrates; wherein the liquid crystal layer is oriented in a spray alignment; and wherein the surfaces of alignment layers formed on the surfaces of the electrodes each have an irregular configuration, the method comprising the step of forming the irregular configurations of the electrode surfaces by use of a UV asher, ozone asher, UV/ozone asher or the like.

A 40th aspect of the invention is a method of manufacturing a liquid crystal display which has a pair of substrates having electrodes and a liquid crystal layer sandwiched between the pair of substrates; wherein the liquid crystal layer is oriented in a spray alignment; and wherein the surfaces of alignment layers formed on the surfaces of the electrodes each have an irregular configuration, the method comprising: a dispersion step of dispersing, beforehand, powder or minute particles into printing varnish used for forming the alignment layers on the surfaces of the electrodes; and an alignment layer formation step of forming the alignment layers by applying the varnish onto the surfaces of the electrodes and baking the varnish.

These methods obviate the need for a photolitho-process for forming projections, thereby simplifying the manufacturing method and reducing manufacturing cost. In addition, the liquid crystal molecules within the liquid crystal layer are consequently brought into an alignment state having various liquid crystal directors, but they are basically in a state having surface alignment directors perpendicular to the substrates. As a result, a liquid crystal display can be obtained in which a shift to the bend alignment can be quickly performed with the portions having directors perpendicular to the substrates as cores, during an initialization process for a spray to bend transition.

Fifth Invention Group

A 41st aspect of the invention is a liquid crystal display which comprises a pair of substrates having electrodes and a spray-aligned liquid crystal layer sandwiched between the pair of substrates; wherein a plurality of spacers are placed between the pair of substrates; wherein the spacers are securely attached to at least either one of the substrates with an adhesive which increases the pretilt angle of liquid crystal molecules within the liquid crystal layer; and wherein the adhesive is spread over the substrate.

A 42nd aspect of the invention is a liquid crystal display constructed according to the 41st aspect of the invention, wherein the adhesive is spread over a distance approximately no less than the diameter of each spacer, being centered on the spacer.

A 43rd aspect of the invention is a liquid crystal display constructed according to the 41st aspect of the invention, wherein the adhesive is spread, in one direction from each spacer, over a distance approximately no less than the radius of the spacer, being centered on the spacer.

With the above arrangements, the liquid crystal molecules located at each spacer are oriented in a one-side HAN alignment or HAN alignment, the one-side HAN alignment being such that the pretilt angle is spuriously increased by regions where said at least one of the pair of substrates differ from the other substrate. Therefore, a shift to the bend alignment can be quickly performed during an initialization process for a spray to bend transition.

A 44th aspect of the invention is a liquid crystal display constructed according to the 41st aspect of the invention, wherein the adhesive contains, as a component, a fluorine type alignment material, a fluorine type material or a long-chain alkyl material.

A 45th aspect of the invention is a liquid crystal display constructed according to the 41st aspect of the invention, wherein a voltage is applied across the electrodes to cause a transition of the liquid crystal layer from a spray alignment to a bend alignment, thereby performing displaying.

A 46th aspect of the invention is a method of manufacturing a liquid crystal display which comprises a pair of substrates having electrodes and a spray-aligned liquid crystal layer sandwiched between the pair of substrates, the method comprising: a spacer scattering step of scattering spacers onto at least either one of the pair of substrates, the spacers having an adhesive adhered thereto which increases the pretilt angle of liquid crystal molecules within the liquid crystal layer; a substrate stationary placement step of placing the substrate so as to be stationary over which the adhesive is allowed to spread; and a liquid crystal cell formation step of forming a liquid crystal cell by sticking the pair of substrates together.

A 47th aspect of the invention is a liquid crystal display manufacturing method according to the 46th aspect of the invention, wherein in the substrate stationary placement step, the substrate is horizontally placed so as to be stationary and the adhesive is spread over a distance approximately no less than the diameter of each spacer, being centered on the spacer.

A 48th aspect of the invention is a liquid crystal display manufacturing method according to the 46th aspect of the invention, wherein, in the substrate stationary placement step, the substrate is vertically placed so as to be stationary and the adhesive is spread, in one direction from each spacer, over a distance approximately no less than the radius of the spacer, being centered on the spacer.

With the above methods, the liquid crystal molecules located at each spacer are oriented in a one-side HAN alignment in which the pretilt angle is spuriously increased by regions in at least one of the pair of substrates which differ from their corresponding regions in the other substrate. This enables an OCB type liquid crystal display in which a shift to the bend alignment can be quickly performed during an initialization process for a spray to bend transition.

A 49th aspect of the invention is a method of manufacturing a liquid crystal display which comprises a pair of substrates having electrodes and a spray-aligned liquid crystal layer sandwiched between the pair of substrates, the method comprising: a spacer scattering step of scattering spacers onto at least either one of the pair of substrates, the spacers having an adhesive adhered thereto which increases the pretilt angle of liquid crystal molecules within the liquid crystal layer; and a substrate stationary placement step of sticking the pair of substrates together on which the adhesive is allowed to spread.

With the above method, the liquid crystal molecules located at each spacer are oriented in a HAN alignment in which the pretilt angle is spuriously increased, so that an OCB type liquid crystal display can be obtained in which a shift to the bend alignment is quickly performed during an initialization process for a spray to bend transition.

BRIEF DESCRIPTION OF THE DRAWINGS

FIG. 1 is conceptual structural views of a liquid crystal display according to an embodiment 1 of the invention.

FIG. 2 is schematic views of a liquid crystal display when a transition test is conducted with projections formed on a flattening film.

FIG. 4 is conceptual structural views of a liquid crystal display according to an embodiment 2 of the invention.

FIG. 6 is conceptual structural views of still another liquid crystal display according to the embodiment 2 of the invention.

FIG. 7 is conceptual structural views of a liquid crystal display according to an embodiment 3-1 of the invention.

FIG. 9 is conceptual structural views of a liquid crystal display according to an embodiment 3-2 of the invention.

FIG. 10 is conceptual views of a method of manufacturing the liquid crystal display according to the embodiment 3-2 of the invention.

FIG. 12 is conceptual views depicted for explaining the movement of liquid crystal directors when transited from a spray alignment to a bend alignment in an OCB mode type liquid crystal display.

Figure 3:
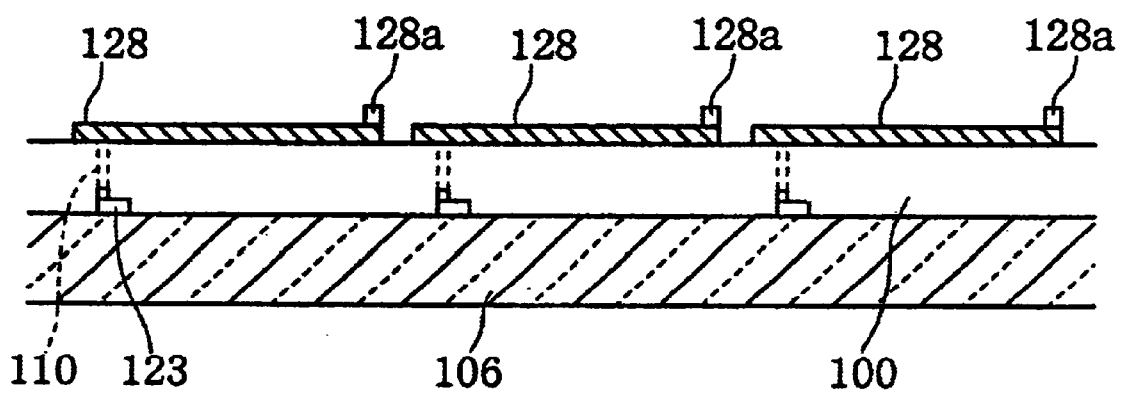
FIG. 3 is a schematic view showing pixel electrodes each of which has an end higher than the average height of the pixel electrode.

BEST MODE FOR CARRYING OUT THE INVENTION (1) An Embodiment of the First Invention Group Referring now to the drawings, the first invention group of the present invention will be described below.

Embodiment 1

FIG. 1 shows conceptual structural views of a liquid crystal display constructed according to an embodiment 1 of the invention. Specifically, FIG. 1(*a*) is a conceptual structural sectional view showing the liquid crystal display on the basis of pixel unit; FIG. 1(*b*) is a conceptual structural plan view similarly showing the liquid crystal display on the basis of pixel unit; and FIG. 1(*c*) diagrammatically shows a bend alignment state and aligning direction of liquid crystal molecules as viewed from their sides.

The liquid crystal display of this embodiment has an active matrix type liquid crystal cell 124 at either or both sides of which two polarizers and a phase compensator for optical compensation (not shown) are provided.

The liquid crystal cell 124 has an opposed substrate 105 and an array substrate 106 which face each other. Arranged on the array substrate 106 are switching elements 123 made of TFT, source wiring electrodes 181 and others. The switching elements 123 and the source wiring electrodes 181 etc. are laminated with a flattening film 100 having a thickness of about 3 $\mu$m and made of a transparent insulating film material such as transparent acrylic organic polymers.

A pixel electrode 128 made of ITO is formed for every pixel unit so that a plurality of pixel electrodes 128 are spaced at intervals of about 3 $\mu$m on the flattening film 100. The drain electrode of each switching element 123 is conducted to its corresponding pixel electrode 128 through a conducting inlet 110 formed on the flattening film 100.

An opposed electrode 127 is formed on the opposed substrate 105. Formed on the surfaces of the opposed electrode 127 and the pixel electrodes 128 are alignment layers 129 and 191, respectively, which are made by applying and baking, for example, a polyamic acid type polyimide alignment film material produced by Nissan Chemical Industries, Ltd.

Interposed between the alignment layers 129 and 191 are spacers (not shown) having a diameter of about 5 $\mu$m for keeping a constant spacing between the array substrate 106 and the opposed substrate 105 and a liquid crystal layer 122 made of a nematic liquid crystal material having positive dielectric anisotropy.

The alignment layers 129, 191 are treated in the same direction (i.e., in the direction of the source wiring electrodes 181 as indicated by arrow in FIG. 1(*b*)) so as to be substantially parallel with each other, such that the pretilt angles of the liquid crystal molecules on their surfaces are about 5 to 6 degrees, being opposite to each other in a positive/negative sense.

Although not shown in the drawings, such treatment creates the liquid crystal cell 124 of the so-called spray alignment in which liquid crystal molecules within the liquid crystal layer 122 are diagonally spread when the liquid crystal layer 122 is in the so-called non-voltage applied condition.

In the liquid crystal display of the above structure, prior to normal displaying, gate wiring electrodes 126 are brought into a normal scanning condition or almost all of them are turned on and a pulse having a high voltage of −15 V for instance is repeatedly applied across the opposed electrode 127 and the pixel electrodes 128.

With the flattening effect of the flattening film 100, the pixel electrodes 128 can be formed at extremely narrow intervals, and electric field distortion is developed and applied across the pixel electrodes 128, or alternatively, electric field distortion is developed between the pixel electrodes 128 and the gate wiring electrodes 126. This causes a shift from the spray alignment (not shown) to a b-spray alignment 112 at the side portions of the source wiring electrodes or gate wiring electrodes of the pixel electrodes 128 within the pixel region and from this, transition cores of a bend alignment 113 are generated and the bend alignment regions expand.

Finally, the regions of a t-spray alignment 111 are all transited to the bend alignment 113, and accordingly, the pixel region is entirely changed to the bend alignment region in about 0.5 sec.

The transition of the entire TFT panel can be readily completed in about 3 sec. Thus, an OCB display mode liquid crystal display can be achieved, which is composed of an active matrix type liquid crystal cell free from displaying defects and capable of causing a reliable, quick transition and which ensures high response speed, a wide view angle and high picture quality.

The electric field distortion occurring in the narrow space between the adjacent pixel electrodes permits the liquid crystal molecules in the vicinity of the side portions of the pixel electrodes to be aligned in a horizontal condition on the surface of the substrate, causing the so-called b-spray alignment 112 so that their energy of distortion becomes higher than the surroundings. In this condition, high voltage is applied across the upper and lower electrodes, thereby further imparting energy, so that transition cores develop beside the pixel electrodes and the regions of the bend alignment 113 are expanding.

In addition, by reducing the irregularities of the surfaces of the pixel electrodes 128 themselves or irregularities throughout the pixel electrode region by use of the flattening film 100, the transition from the spray alignment to the bend alignment can be easily and reliably carried out.

Herein, the experiment shown in FIG. 2 was conducted. FIG. 2 is a schematic view when a transition test was conducted with projections formed on the flattening film. Specifically, FIG. 2(a) is a conceptual structural sectional view showing a liquid crystal display on the basis of pixel unit and FIG. 2(b) is a conceptual structural plan view similarly showing the liquid crystal display on the basis of pixel unit.

As shown in FIG. 2(a), projections 100a, 100b, 100c, 100d were formed on the flattening film 100 and the relationship between the flatness of the flattening film and the transition from the spray alignment to the bend alignment was checked in the experiment. It should be noted that the heights of the projections 100a, 100b, 100c and 100d are 1 $\mu$m, 0.5 $\mu$m, 0.5 $\mu$m, and 2 $\mu$m, respectively.

In the liquid crystal display having such a structure, prior to normal displaying, the gate wiring electrodes 126 were brought into a normal scanning condition or almost all of them were turned on, and then a pulse having a high voltage of −15V for instance was repeatedly applied across the opposed electrode 127 and the pixel electrodes 128, in the same way as described earlier. Thus, regions of the bend alignment 113 were expanded within the pixel region.

As a result, it was observed that the regions of the bend alignment 113 which had developed in the side portions of the source wiring electrodes or gate wiring electrodes of the pixel electrodes 128 could expand, overriding the projections 100a, to 100c, but could not expand, overriding the projection 100d so that the bend alignment regions stopped at the projection 100d. It is understood from the result of this experiment that perfect flattening by the flattening film 100 is not required, and practically, the level difference of the flattening film 100 may be 1 $\mu$m or less and more preferably 0.5 $\mu$m or less.

By flattening the substrate with the flattening film, the spacing between adjacent pixel electrodes can be shortened. In a known ordinary configuration, the spacing between adjacent pixel electrodes is as long as about 20 $\mu$m, because a sufficient fitting margin is necessary between pixel electrodes and a source electrode. On the other hand, in the invention, the spacing between the pixel electrodes can be set taking into account only the fitting margin for a pixel electrode to a pixel electrode, so that the spacing can be reduced to 10 $\mu$m or less which is no more than one half the known case. By thus shortening the spacing between the pixel electrodes, the transition proceeds between the pixel electrodes more smoothly, expanding across the space between the pixels. This spacing is preferably within the range of 1 $\mu$m to 10 $\mu$m and more preferably within the range of 1 $\mu$m to 5 $\mu$m.

The configuration shown in FIG. 3 may be employed. Specifically, a conductive projection 128a made of a resin or the like covered with ITO is formed on each pixel electrode 128, particularly, at one end thereof, whereby the development of transition cores in the neighborhood of the projections 128a can be further promoted.

As far as the space between the transitions cores is flat, or as far as the areas toward which the transition cores expand are flat, the bend regions can easily expand.

As described earlier, by reducing irregularities and shortening the spacing between every adjacent pixel electrodes, the transition can be easily, reliably carried out throughout the liquid crystal cell.

(2) An Embodiment of the Second Invention Group

Reference is made to the drawings to hereinafter describe the second invention group of the invention.

Embodiment 2

FIG. 4 is conceptual structural views of a liquid crystal display constructed according to Embodiment 2 of the invention. Specifically, FIG. 4(a) is a conceptual structural sectional view showing the liquid crystal display on the basis of pixel unit, whereas FIG. 4(b) is a conceptual structural plan view similarly showing the liquid crystal display on the basis of pixel unit.

As shown in FIG. 4(a), the liquid crystal display of Embodiment 2 of the invention has an active matrix type liquid crystal cell 134 having, at either or both sides thereof, two polarizers and a phase compensator for optical compensation (not shown).

The liquid crystal cell 134 has the opposed substrate 105 and the array substrate 106 on which switching elements 133 made of TFT, the source wiring electrodes 181 and others are disposed. Laminated to the tops of the switching elements 133, the wiring electrodes 181 and others is the flattening film 100 made of a transparent insulating film material such as transparent acrylic organic polymers and having a thickness of about 3 $\mu$m.

A pixel electrode 138 made of ITO is formed for every pixel so that a plurality of pixel electrodes 138 are spaced at intervals of about 8 $\mu$m on the flattening film 100. The drain electrode of each switching element 133 is conducted to its corresponding pixel electrode 138 through the conducting inlet 110 formed on the flattening film 100.

The opposed electrode 127 made of ITO is formed on the opposed substrate 105. 7 $\mu$m-wide, column-like conductive formation members 141 electrically conducted to the opposed electrode 127 are positioned above the respective spaces between the adjacent pixel electrodes 138. It is also possible to place the conductive formation members 141 in the region of the pixel electrodes 138 (i.e., the areas above the pixel electrodes 138).

The length of the column-like conductive formation members 141 is about 3 μm which is shorter than the diameter (5 μm) of spacers provided for keeping the gap between the substrates 105 and 106 constant. The conductive formation members 141 are formed so as to be electrically insulated from the array substrate 106. That is, the conductive formation members 141 are positioned above the spaces between the pixel electrodes 138, but have a non-contact, electric insulation relationship with the array substrate 106.

To further improve the electric insulation of the conductive formation members 141, at least the leading ends of the conductive formation members 141 may be covered with an electric insulating material such as $SiO_2$ and SiNx. Of course, the conductive formation members 141 may be entirely covered with an electric insulating material. The conductive formation members 141 themselves can be formed, for instance, through the process for forming the color filter, ITO and others which constitute the opposed electrode.

A polyimide alignment film material of a polyamic acid type produced, for example, by Nissan Chemical Industries, Ltd. is applied to the surfaces of the opposed electrode 127, the conductive formation members 141 and the pixel electrodes 138 thus prepared and then baked, thereby forming the alignment layers 129, 191.

The alignment layers 129, 191 are treated so as to be aligned in the same direction (i.e., in the direction of the source wiring electrodes 181 as indicated by arrow in FIG. 4(b)) in substantially parallel with each other, such that the pretilt angles of the liquid crystal molecules on the surfaces of the alignment layers 129, 191 are about 5 to 6 degrees, being opposite to each other in a positive/negative sense.

A liquid crystal layer 122 made of a nematic liquid crystal material having positive dielectric anisotropy is inserted between the substrate 105 and 106.

In this way, a spray alignment type liquid crystal cell 134 is formed, in which the liquid crystal layer 132 is composed of an alignment region in which the liquid crystal molecules are diagonally spread when the liquid crystal layer 132 is in the so-called no voltage applied condition.

In the above liquid crystal display, prior to normal displaying, the gate wiring electrodes 136 are brought into a normal scanning condition or almost all of them are turned on, and then a pulse having a high voltage of −15V for instance is repeatedly applied across the opposed electrode 127 and the pixel electrodes 138. At that time, a diagonal strong electric field is developed and applied across the conductive formation members 141 electrically connected to the opposed electrode 127 and the aide portions of the pixel electrodes 138 which are in close proximity to the conductive formation members 141. This cause an alignment change such that, the spray alignment within the pixel region is changed to the b-spray alignment 112 at the side portions of the pixel electrodes 138 close to the conductive formation members 141. Then, the transition cores of the bend alignment 113 develop and the regions of the bend alignment 113 expand.

Although not shown in the drawings, all the t-spray alignment regions which have been formed are finally changed to the bend alignment 113. The pixel region can be entirely changed to the bend alignment in about 0.2 sec., and the transition of the whole TFT panel can be quickly completed in about 1 sec. Thus, an OCB display mode liquid crystal display is obtained, which is composed of an active matrix type liquid crystal cell enabling a reliable, quick transition and free from display defects and which has high response speed, a wide viewing angle and high picture quality.

This is conceivably attributable to the following fact: a diagonal electric field is developed and applied across the conductive formation members 141 and the edges of the pixel electrodes 138 which are in close proximity to the conductive formation members 141, giving rise to an electric field distortion which causes the liquid crystal molecules near the distortion to be aligned in a horizontal condition on the substrate surface (this is the so-called b-spray alignment 112), so that the energy of distortion of the liquid crystal molecules becomes higher than the surroundings. In this condition, high voltage is applied across the upper and lower electrodes, whereby energy is further imparted, developing the transition cores of the bend alignment at the edges of the pixel electrodes and then the regions of the bend alignment 113 are expanding.

Figure 5:
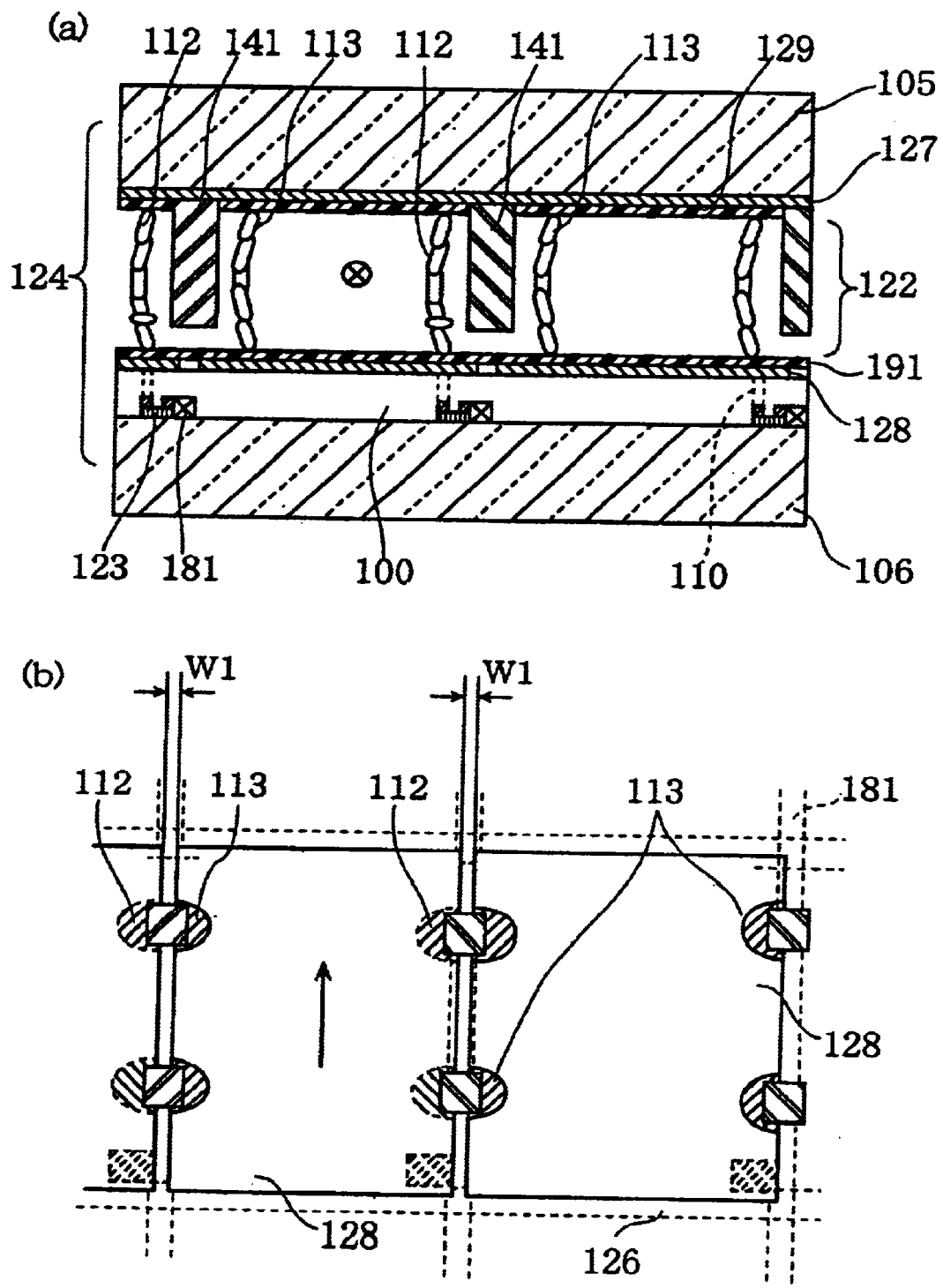
FIG. 5 is conceptual structural views of another liquid crystal display according to the embodiment 2 of the invention.

As shown in FIG. 5, the width of the conductive formation members 141 may be larger than the spacing W1 between the pixel electrodes and therefore the conductive formation members 141 may partly ride on the pixel electrodes 128. Although not shown in the drawings, the conductive formation members 141 may be much smaller.

In view of the aperture ratio of the pixels, the spacing between the pixel electrodes may be 10 μm or less and more preferably within the range of from 1 μm to 5 μm.

The conductive formation members 141 are not limited to particular shapes but may be in the form of a column or trapezoid. Additionally, although the conductive formation members 141 are positioned above the source wiring electrodes 181, it is obvious that the conductive formation members 141 may be positioned above the gate wiring electrodes 126.

While the conductive formation members 141 have length shorter than the diameter of the spacers (not shown) provided for keeping the gap between the substrates 105 and 106 constant in the present embodiment, they may serve by themselves as spacers for constantly keeping the gap between the substrates 105 and 106 which face each other, as shown in FIG. 6.

In other words, the conductive formation members 142 are formed so as to have approximately the same length as ordinary spacers for keeping the gap between the substrates 105 and 106 constant.

In this case, since the conductive formation members 142 are positioned between the pixel electrodes 138, it is necessary for keeping electrical insulation to set the width of the conductive formation members 142 to be narrower than the spacing W2 between the pixel electrodes. But, provided that at least the leading ends of the spacer conductive formation members 142 are covered with an electrically insulating material at their leading ends, the width of the conductive formation members 142 may be larger than the spacing W2 between the pixel electrodes. The shape of the conductive formation members 142 is not particularly limited.

The liquid crystal display thus prepared does not need ordinary spacers and therefore it can be manufactured by a spacerless process, which contributes to simplification of the manufacturing process. Further, by virtue of the spacerless process, the liquid crystal display can perform more uniform displaying.

Accordingly, an OCB display mode liquid crystal display can be achieved, which is composed of a liquid crystal cell capable of causing a reliable, quick transition and free from display defects and which ensures high response speed, a wide view angle and high picture quality.

In the present embodiment, the pixel electrodes are formed on the flattening film which covers the switching elements and the wiring electrodes, and the conductive formation members conducted to the opposed electrode are each positioned between every adjacent pixel electrodes. The same transition facilitating effect can be achieved by an alternative arrangement in which ordinary pixel electrodes are disposed on the array substrate 106 without the flattening film and the conductive formation members conducted to the opposed electrode are respectively positioned at the spaces between the adjacent pixel electrodes.

Further, in another alternative liquid crystal display, the substrates may be formed from plastics, or either of the substrates may be formed from a reflective material or silicon.

Other Features Associated with the First and Second Invention Groups (1) The material of the flattening film may be a transparent inorganic thin film material such as silica. (2) The alignment layers may be formed from any materials as far as the specified pretilt angle can be obtained. Examples of the material of the alignment layers include polyimide materials. The alignment treatment may be done by a non-rubbing alignment treatment technique such as optical alignment.

(3) While the alignment treatment is done in a direction parallel to the source wiring electrodes in the above description, it may be done in a direction parallel to the gate wiring electrodes. Further, it may be done in a direction diagonal to the wiring electrode lines. The direction of the alignment treatment can be arbitrarily selected according to optical viewing angle characteristics.

(4) The liquid crystal display to which the invention is applied is not limited to the OCB mode but may be of any other modes in which speeding-up of the phase transition of the liquid crystal layer is required.

(3) Embodiments of the Third Invention Group

Referring to the drawings, the third invention group of the invention will be described below.

Embodiment 3–1

FIG. 7 shows conceptual structural views of a liquid crystal display constructed according to an embodiment 3–1 of the invention. As shown in FIG. 7(*a*), the liquid crystal display of this embodiment is composed of a liquid crystal cell 224 at either or both sides of which there are provided two polarizers and a phase compensator for optical compensation (not shown).

The liquid crystal cell 224 has substrates 205, 206 which face each other. Disposed on the substrate 205 is an opposed electrode 217. Disposed on the substrate 206 is pixel electrodes 271. On the electrodes 217, 271, a plurality of conductive particles 280 (at least one conductive particle is needed) are dispersedly placed, the particles being made of polymer resin particles the surfaces of which are coated with an Au thin film having a diameter of approximately 1.5 μm.

Alignment layers 290, 291 are so formed as to cover the surface of the opposed electrode 217 and the surface of the pixel electrodes 271 and the conductive particles 280.

Inserted between the alignment layers 290, 291 are spacers (not shown) which have a diameter of about 5 μm for keeping the gap between the substrates constant and a liquid crystal layer 222 made of a nematic liquid crystal material having positive dielectric anisotropy.

The alignment layers 290, 291 are treated so as to be aligned in the same direction (i.e., in the lateral direction on the plane of the drawing) in substantially parallel with each other, such that the liquid crystal layer 222 forms the so-called spray alignment composed of an alignment region in which the liquid crystal molecules are diagonally spread when the liquid crystal layer 222 is in the so-called no voltage applied condition and such that the pretilt angles of the liquid crystal molecules on the surfaces of the alignment layers 290, 291 are about 5 to 6 degrees, being opposite to each other in a positive/negative sense.

Since the area occupied by the conductive particles 280 is much smaller than the area of the alignment layers 290, 291, the alignment of the whole liquid crystal layer is virtually unaffected. Therefore, there is formed the liquid crystal cell 224 of the so-called spray alignment 221 composed of an alignment region where the liquid the crystal molecules in the liquid crystal layer 222 are diagonally spread when the liquid crystal layer 222 is in the so-called no voltage applied condition.

Next, a method of manufacturing the above liquid crystal display will be described.

Figure 8:
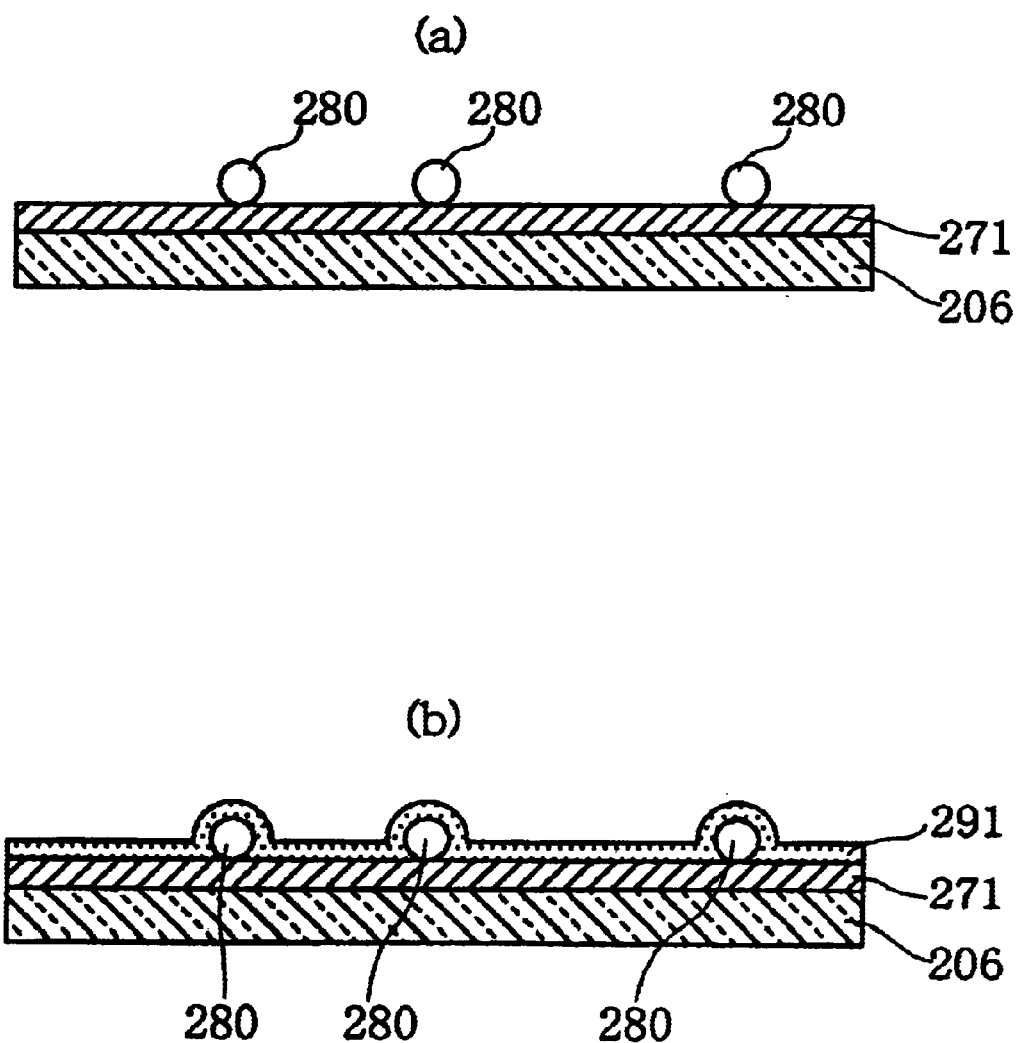
FIG. 8 is conceptual views of a method of manufacturing the liquid crystal display according to the embodiment 3–of the invention.

FIG. 8 is a conceptual view illustrating a method of manufacturing the liquid crystal display of the embodiment 2–1.

First of all, the pixel electrodes 271 are formed on the substrate 206.

As shown in FIG. 8(*a*), the conductive particles 280 are then dispersed such that a plurality of conductive particles 280 (at least one conductive particle is necessary for each pixel) are placed on the pixel electrodes 271 for every pixel by use of air or an inert gas, the conductive particles 280 being made of polymer resin particles whose surfaces are coated with an Au thin film having a diameter of about 1.5 μm, and the surfaces of the conductive particles 280 having a thermoplastic or thermosetting adhesive applied thereto.

Thereafter, heat is applied to the substrate 206 to securely adhere the conductive particles 280 to the pixel electrodes 271.

As shown in FIG. 8(*b*), a polyamic acid type polyimide alignment film material varnish, for example, produced by Nissan Chemical Industries, Ltd. is applied by a spinner or a printer to cover the surfaces of the pixel electrodes 271 and the conductive particles 280. Then, baking is carried out to form the alignment layer 291.

Although not shown in the drawings, the same process is performed to disperse the conductive particles 280 and form the alignment layer 290 on the substrate 205.

Then, the alignment layers 290, 291 are treated so as to be aligned in the same direction in substantially parallel with each other, such that the liquid crystal layer forms the so-called spray alignment composed of an alignment region in which the liquid crystal molecules are diagonally spread when the liquid crystal layer is in the so-called no voltage applied condition and such that the pretilt angles of the liquid crystal molecules on the surfaces of the alignment layers 290, 291 are about 5 to 6 degrees, being opposite to each other in a positive/negative sense.

For keeping the gap between the substrates 205, 206 constant, the spacers having a diameter of about 5 μm and the liquid crystal layer made of a nematic liquid crystal material having positive dielectric anisotropy are inserted between the substrates 205, 206.

Next, the operation of the liquid crystal display thus formed will be described.

Reference is now made to the conceptual structural sectional view of FIG. 7(*b*) which illustrates the liquid crystal display on the basis of pixel unit. Prior to normal displaying, pulses having for example high voltages of ±15V were repeatedly applied across the opposed electrode 217 and the pixel electrodes 271 continuously or intermittently at intervals of several tens of ms to hundreds of ms. This caused electric field concentration at the conductive particles 280 placed on the opposed electrode 217 and on the pixel electrodes 271. Then, an alignment change occurred in the neighborhood of the conductive particles 280 from the spray alignment (now shown) within the pixel region, and transition cores of the bend alignment 213 developed with the conductive particles 280 serving as base points. The subsequent application of high voltage made the bend alignment regions expand.

The pixel region could be entirely shifted to the bend alignment region in about 0.5 sec. and the transition of the whole panel could be quickly completed in about 2 sec. After the completion of the transition, the liquid crystal display was connected to an ordinary display driving circuit. Thus, an OCB display mode liquid crystal display could be obtained, which was composed of a liquid crystal cell capable of performing reliable, quick transition and free from display defects and which had high response speed, a wide viewing angle and high picture quality.

Although the conductive particles 280 are securely attached to both of the substrates 205, 206 which face each other in the present embodiment, the conductive particles 280 may be securely attached to either one of the substrates.

Embodiment 3–2

FIG. 9 shows a conceptual structural view of a liquid crystal display constructed according to an embodiment 3–2 of the invention.

As shown in FIG. 9(a), the liquid crystal display comprises an active matrix type liquid crystal cell 234 at either or both sides of which two polarizers and a phase compensator for optical compensation (these are not shown) are disposed.

The liquid crystal cell 234 has an opposed substrate 205 and an array substrate 206 which face each other. On the array substrate 206, a switching element 243 made of TFT, a gate wiring electrode and a source wiring electrode (not shown) are disposed for every pixel. Connected to each switching element 243 is the pixel electrode 271 made of ITO. An opposed electrode 217 made of ITO is formed on the opposed substrate 205.

Formed on the surfaces of the opposed and pixel electrodes 217, 271 are alignment layers 290, 291 in which the conductive particles 280 are mixed and dispersed. The conductive particles 280 are made of polymer resin particles which have a diameter of about 1.5 µm and whose surfaces are coated with an Au thin film.

Most of the conductive particles 280 are in electrical contact with the electrodes 217, 271. Although the conductive particles 280 are dispersed on both of the substrates 205, 206 in this embodiment, the conductive particles 280 may be dispersed in either one of the substrates.

The alignment layers 290, 291 are treated so as to be aligned in the same direction in substantially parallel with each other, such that the pretilt angles of the liquid crystal molecules on their surfaces are about 5 to 6 degrees, being opposite to each other in a positive/negative sense.

The liquid crystal layer 222 made of a nematic liquid crystal material having positive dielectric anisotropy is inserted between the opposed substrate 205 and the array substrate 206. There is formed the liquid crystal cell 234 of the so-called spray alignment 221 composed of an alignment region in which the liquid crystal molecules in the liquid crystal layer 222 are diagonally spread when the liquid crystal layer 222 is in the so-called no voltage applied condition.

Next, there will be explained a method of manufacturing the above liquid crystal display.

FIG. 10 is a conceptual view illustrating a method of manufacturing the liquid crystal display of the embodiment 3–2.

As shown in FIG. 10(a), wiring electrodes (not shown), the switching elements 243, and the pixel electrodes 271 are formed on the array substrate 206.

Then, the conductive particles 280 made of Au spherical particles having a diameter of e.g., about 1.5 µm which is smaller than the gap between the substrates and a polyamic acid type polyimide alignment film material varnish produced by e.g., Nissan Chemical Industries, Ltd. are mixed and dispersed.

As shown in FIG. 10(b), the material prepared by mixing the alignment film material with the conductive particles such that the particles are dispersed therein is applied onto the surfaces of the pixel electrodes 271 of the substrate 206 by means of a spinner or a printer and then, baking is carried out to form the alignment layer 291 containing the conductive particles 280 dispersed therein.

Although not shown in the drawings, the conductive particles 280 are dispersed and the alignment layer 290 is formed on the substrate 205 in the same way.

The alignment layers 290, 291 are treated so as to be aligned in the same direction in substantially parallel with each other, such that the liquid crystal layer forms the so-called spray alignment composed of an alignment region in which the liquid crystal molecules are diagonally spread when the liquid crystal layer is in the so-called no voltage applied condition and such that the pretilt angles of the liquid crystal molecules on their surfaces are about 5 to 6 degrees, being opposite to each other in a positive/negative sense.

Although not shown in the drawings, spacers having a diameter of about 5 µm for keeping the gap between the substrates constant and the liquid crystal layer made of a nematic liquid crystal material having positive dielectric anisotropy are inserted between the substrates.

Since the area occupied by the conductive particles is much smaller than the area of the alignment layers, the alignment of the whole liquid crystal layer is virtually unaffected. Therefore, there is formed the liquid crystal cell of the so-called spray alignment composed of an alignment region where the liquid crystal molecules in the liquid crystal layer are diagonally spread when the liquid crystal layer is in the so-called no voltage applied condition.

Next, the operation of the liquid crystal display thus formed will be described.

Reference is now made to the conceptual structural sectional view of FIG. 9(b) which illustrates the active matrix type liquid crystal display on the basis of pixel unit. Prior to normal displaying, the gate electrodes were brought into a normal scanning condition or almost all of the gate electrodes were turned on. In this condition, a pulse having a high voltage of e.g., −15V was repeatedly applied across the opposed electrode 217 and the pixel electrodes 271 continuously or intermittently at intervals of several tens of ms to hundreds of ms. This may be carried out by applying −15V pulses based on the voltage applied to the opposed electrode. Alternatively, bias voltage may be superimposed to the above pulse voltage.

The above voltage application caused electric field concentration around the conductive particles 280 in contact with the electrodes 217, 271. Then, an alignment change occurred in the neighborhood of the conductive particles 280 from the spray alignment (now shown) within the pixel region, and from this, transition cores of the bend alignment 213 developed. The subsequent application of high voltage allowed the bend alignment regions to expand. The pixel region could be entirely shifted to the bend alignment region in about 0.5 sec. and the transition of the whole panel could be quickly completed in about 1 sec.

After the completion of the transition, the liquid crystal display was switched to an ordinary display driving circuit. Thus, an OCB display mode liquid crystal display of the active matrix type could be obtained, which was composed of a liquid crystal cell capable of performing reliable, quick transition and free from display defects and which had high response speed, a wide viewing angle and high picture quality.

This is conceivably attributable to the following fact: An extremely strong electric field concentration occurred between the conductive particles and the opposed electrode, causing electric field distortion so that the liquid crystal molecules of the spray alignment in the neighborhood had higher energy of distortion than the surroundings. By virtue of the high voltage continuously applied across the upper and lower electrodes in this condition, energy was further imparted so that transition cores of the bend alignment 213 were generated with the conductive particles 280 serving as base points and the bend alignment regions expanded.

In this way, an OCB display mode liquid crystal display can be achieved, which is composed of an active matrix type liquid crystal cell capable of quickly, reliably transiting from the spray alignment to the bend alignment in the entire liquid crystal layer positioned between the facing substrates and free from display defects and which ensures high response speed, a wide viewing angle and high picture quality.

Other Features Associated with the Third Invention Group (1) While the active matrix type liquid crystal display of the embodiment 3–2 is arranged such that the pixel electrodes 271 and the switching elements 243 are formed at substantially the same level on the surface of the array substrate 206, an active matrix type liquid crystal display having high aperture ratio may be employed in which the pixel electrodes 271 are formed on a flattening film covering in a flattening manner the switching elements 243 or the wiring. More specifically, this liquid crystal display has such a structure that the pixel electrodes are formed on the flattening film having a flattening function and the conductive particles are placed on the pixel electrodes, as described in the description of the first invention group.

(2) Although the glass is employed as the material of the substrates in the above embodiments, the substrates may be formed from plastics and either of the substrates may be formed from a reflective material or formed from silicon.

Figure 11:
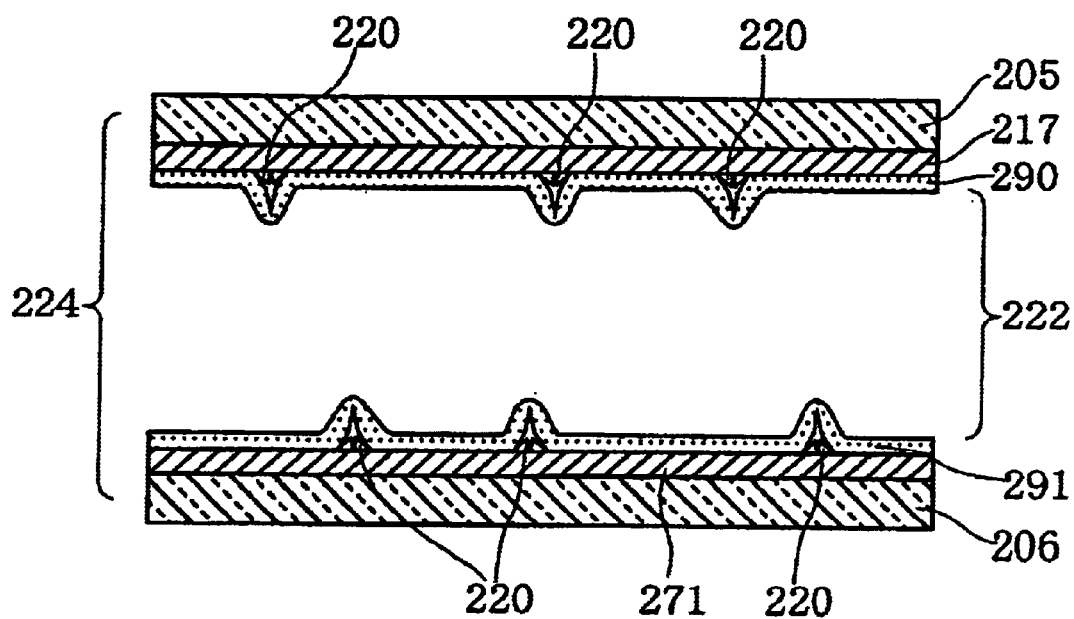
FIG. 11 is a conceptual structural view of a liquid crystal display in which a zinc oxide is used as a conductive particle.

(3) While polymer resin particles the surfaces of which are coated with an Au thin film, or Au spherical particles are used as the conductive particles in the above embodiments, other types of particles may be employed, examples of which include metallic particles such as Ag, Ni and Pd; polymer resin particles the surfaces of which are coated with a Ni or ITO thin film; and inorganic material particles such as glass, aluminum oxides and titanium oxides. Further, zinc oxide whiskers having a shape such as shown in FIG. 11 may be used as the conductive particles. The shape of the conductive particles is not particularly limited.

(4) The diameter of the conductive particles should be smaller than the gap between the substrates when assembled. Where the conductive particles are placed on both of the substrates, the diameter of the conductive particles may be smaller than one half the gap between the substrates. With this arrangement, electrical contact between the electrodes on the substrates can be avoided.

(5) As the particle diameter becomes larger, higher applied voltage is necessary. The conductive particles may have a diameter greater than about one hundredth the gap between the substrates. The number of conductive particles to be dispersedly placed may be at least one for every pixel. Alternatively, a plurality of conductive particles may be placed for every pixel.

Embodiments of the Fourth Invention Group

FIG. 12 diagrammatically, roughly shows the tendency of changes in the movement of the liquid crystal directors within the liquid crystal layer when voltage is applied to a typical OCB mode type liquid crystal display, the voltage being sequentially increased in the way represented by $0 \rightarrow V1 \rightarrow V2 \rightarrow V3 \rightarrow V4 \rightarrow V5$ ($0<V1<V2<V3<V4<V5$).

It should be noted that the same initial value is set for the liquid crystal pretilt angles (i.e., liquid crystal pretilt angles at the time of no voltage application) of both of the right and left alignment layer interfaces (while the alignment layer interfaces are positioned on the right and left hands in FIG. 12, they are actually positioned on the front and back sides when they are in service).

Referring to FIG. 12, the changes in the alignment will be described in detail.

FIG. 12($a$) shows the alignment state (spray state) of a liquid crystal when no voltage is applied. In this case, a liquid crystal director 311$a$ positioned at the center of the cell is reasonably horizontal with respect to the substrates.

When a voltage V1 which is higher than a threshold is applied to the liquid crystal display in the condition of FIG. 12($a$), the liquid crystal molecule at the center of the cell first tilts as shown in FIG. 12($b$). Note that the liquid crystal molecule at the center of the cell is the most likely to move because it is far from the alignment layers which restrain the movement of the liquid crystal molecules. The above tilting movement is accompanied with an increase in the liquid crystal pretilt angle at one alignment layer interface (on the left hand in FIG. 12), while the liquid crystal pretilt angle at the other alignment layer interface (on the right hand in FIG. 12) decreasing. At that time, the position of the liquid crystal director 311$a$ which is horizontal to the substrates becomes closer to the alignment layer interface having a lower pretilt angle.

FIGS. 12($c$) and 12($d$) illustrate conditions in which voltage is further applied (voltage is increased). As shown in these figures, the pretilt angle in the higher pretilt alignment layer interface (on the left hand in FIG. 12) further increases, whereas the pretilt angle in the lower pretilt alignment layer interface (on the right hand in FIG. 12) further decreases. In FIG. 12($d$) which shows a condition where voltage is further increased, most of the liquid crystal molecules having director orientation horizontal to the substrates are present in close proximity to the lower pretilt alignment layer interface.

FIG. 12($e$) shows an alignment state just before a transition to the bend alignment by application of voltage V4, and FIG. 12($f$) shows an alignment state when a transition to the bend alignment has been completed by application of voltage V5. While liquid crystal molecules having director orientation parallel to the alignment layers are present in FIG. 12($e$), there is no such liquid crystal molecules in FIG. 12($f$).

The liquid crystal display, which once has been brought into the alignment state shown in FIG. 12($f$), is quickly shifted to the alignment state (steady state) shown in FIG. 12($g$).

For quickly causing a spray to bend transition with the above transition mechanism, the following conditions have been found to be important: the liquid crystal director orientation in the neighborhood of the center of the liquid crystal layer is perpendicular (orthogonal) to the alignment layers (substrates); and the pretilt angle in one alignment layer interface is small. In other words, by meeting these conditions, a quick spray to bend transition can be achieved.

However, where a voltage in the level of several volts is applied, time on the order of minutes is necessary for the initialization process as discussed earlier.

On the other hand, if a high voltage (e.g., 20V) is applied, another circuit becomes necessary, which disadvantageously leads to increased liquid crystal display manufacturing cost, decreased reliability and display abnormalities.

Therefore, this invention group is directed to an OCB mode liquid crystal display which is characterized in that the alignment layer interfaces, with which the liquid crystal molecules of the liquid crystal layer sealed in the liquid crystal display are in contact, have an irregular configuration respectively for the purpose of causing a quick spray to bend transition.

The invention will be described below in accordance with its embodiments.

Embodiment 4–1

Figure 13:
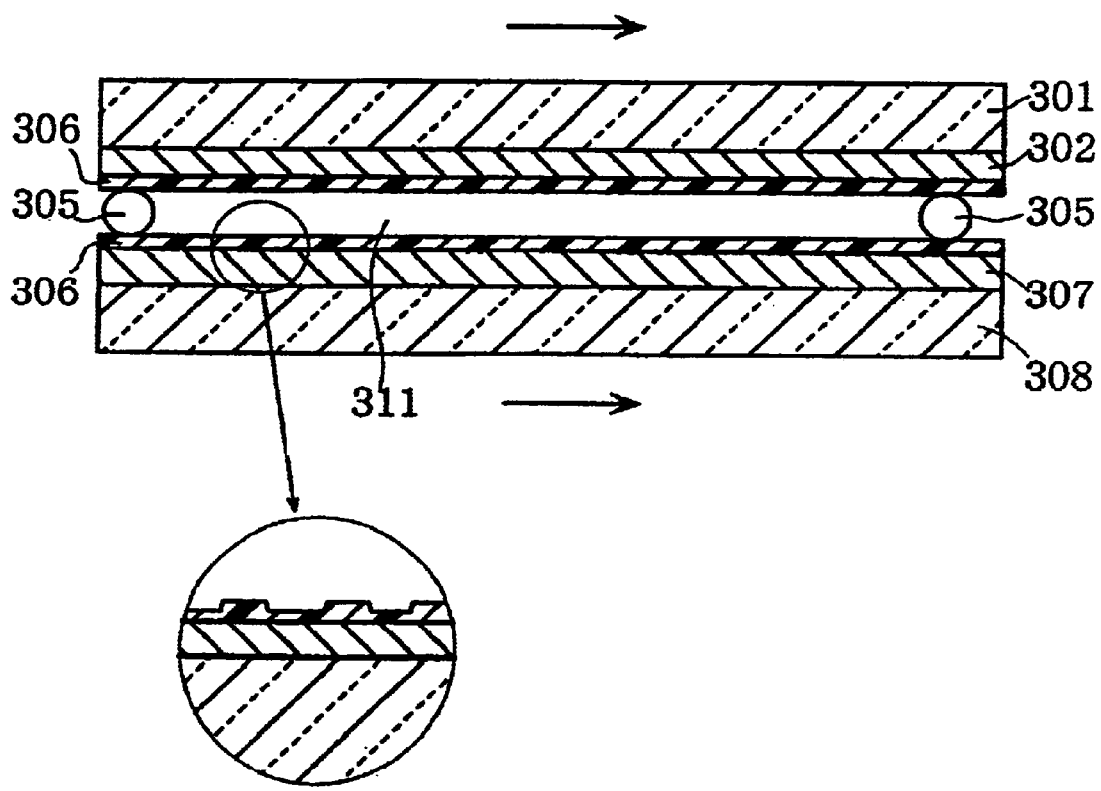
FIG. 13 conceptually shows the sectional structure of a test cell used in a liquid crystal display according to an embodiment 4-1 of the invention.

FIG. 13 conceptually shows the sectional structure of a liquid crystal display according to an embodiment 4–1 of the invention and, more specifically, a test cell used in an experiment for checking the time taken for a spray to bend transition.

The liquid crystal display of this embodiment was prepared by the following manufacturing method: Firstly, Alignment Layer Coating Material SE-7492 (including 6% solid components) produced by Nissan Chemical Industries, Ltd. was applied by letterpress printing onto two glass substrates 301, 308 having transparent electrodes 302, 307, and then cured in a thermostatic oven at a temperature of 180° C. for one hour, whereby alignment layers 306 were formed.

The letterpress printing plate used for the application of the alignment layers 306 was made from a general resin material and designed such that the number of screen lines=100 lines (2.54 mm/100 lines); mesh point pitch=0.254 mm; 30% mesh point diameter=0.157 φ mm; mesh point depth=0.084 mm; mesh point angle=30 degrees. With this letterpress printing plate, alignment layers having a thickness of about 0.1 μm and 0.7 to 0.8 μm-high protrusions were formed.

The alignment layers 306 were rubbed with a rubbing cloth made of rayon and the substrates 301, 308 were adhered to each other by use of spacers produced by Nippon Shokubai Co., Ltd. and Structbond XN-21-S (the name of a sealing resin produced by Mitsui Toatsu Chemical Co., Ltd.) such that the gap between the substrates 301, 308 was 6.5 μm.

In this rubbing treatment, the same rubbing direction (as indicated by arrow of FIG. 13) was adapted for the substrates 301, 308.

Thereafter, Liquid Crystal MJ96435 produced by Merck & Co., Inc. was vacuum-injected into the liquid crystal cell and the cell was sealed by Sealing Resin 352A (the UV hardenable type resin produced by Loctite Japan, Corp.).

Then, polarizers were attached to the substrates from above and below such that the polarizing axes were at 45° with respect to the rubbing direction of the alignment layers and such that the polarizing axes cross each other at right angles, whereby a test cell was prepared. The cell thus prepared is called "test cell A".

For comparison, test cells R1 and R2 having the same structure as the test cell A were produced in the same way as the test cell A, except the following points: The alignment film material of the test cell R1 was applied by spin coating and the alignment film material of the test cell R2 was applied by use of a widely-used resinous letterpress printing plate having 300 screen lines.

Then, the time required for a transition from the spray alignment to the bend alignment throughout the electrode region was observed, when 45 Hz, 7V rectangular waves were applied to each of the test cells A, R1 and R2.

TABLE 1 shows the time required for a transition from the spray alignment to the bend alignment throughout the electrode region in each of the test cells A, R1, R2 when 45 Hz, 7V rectangular waves were applied to these cells.

TABLE 1

| TEST CELL | TRANSITION TIME | NOTES |
|---|---|---|
| A | –5 | Molecules on the surfaces were completely transited. |
| R1 | 20–30 | Molecules on the surfaces were completely transited. |
| R2 | 20–30 | Molecules on the surfaces were completely transited |

(unit: sec.)

As seen from TABLE 1, the transition times of the test cells R1, R2 were 20 to 30 sec., whereas the transition time of the test cell A of the invention was quick, namely, no longer than 5 sec.

The above result is attributable to the following fact: The liquid crystal molecules act so as to spuriously increase in their pretilt angle in regions where the thickness of the alignment layer changes. That is, asymmetry occurs in the spray alignment state by the amount corresponding to the angle of inclination caused at the stepped portions of the alignment layers. The synergistic effect of the asymmetry and the electric field makes the liquid crystal directors more likely to be orthogonal to the test cell substrate surfaces and therefore to the alignment layer surfaces. Therefore, the displacement of the liquid crystal directors proceeds extremely smoothly so that a high-speed spray to bend transition can be carried out.

It is apparent from the comparison between the test cell R2 and the test cell A that if the number of screen lines in the resinous letterpress printing plate increases, the effect of speeding up the transition will be lost.

The reason for this is that as the number of screen lines in the resinous letterpress plate increases, stepped portions are more unlikely to be created in the alignment layers, so that the coating film condition of this case becomes similar to that of the case where spin coating is adapted like the test cell R2 (i.e., the condition in which no stepped portions exist).

TABLE 2 shows a change in the transition time of each test cell when 45 Hz, 5V rectangular waves were applied in a similar voltage application test.

TABLE 2

| TEST CELL | TRANSITION TIME | NOTES |
| --- | --- | --- |
| A | –40 | Molecules on the surfaces were completely transited. |
| R1 | 420– | There were remained non-transited molecules. |
| R2 | 380– | There were remained non-transited molecules. |

(unit: sec.)

As seen from TABLE 2, it took about 400 sec. for completing a transition in the test cells R1 and R2. There were remained non-transited liquid crystal molecules within this transition time and the transition would not proceed further. In contrast to this, transition quickly occurred and finished in 40 sec. in the test cell A of the invention.

Embodiment 4–2

Figure 14:
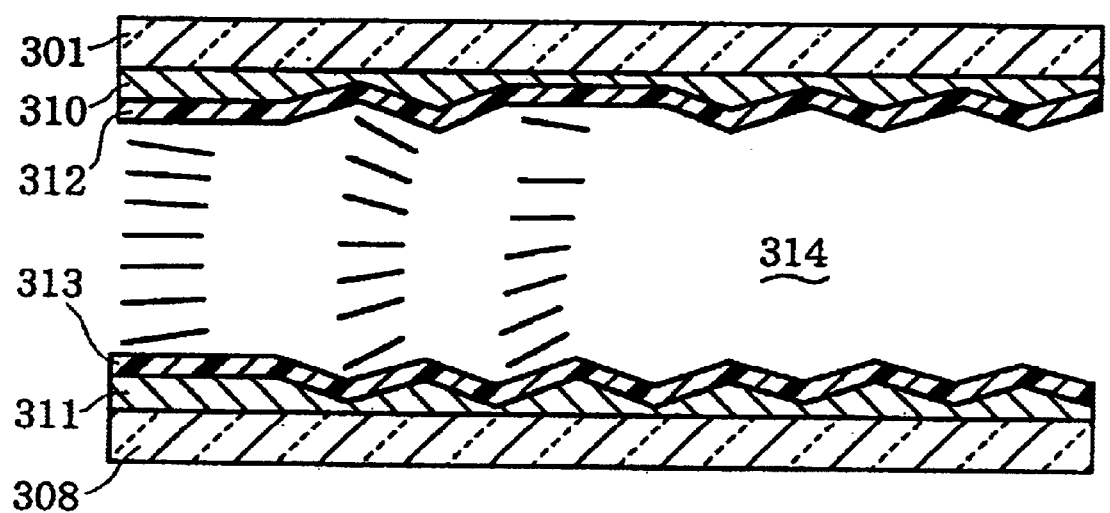
FIG. 14 conceptually shows the sectional structure of a test cell used in a liquid crystal display according to an embodiment 4-2 of the invention.

FIG. 14 conceptually shows the sectional structure of a liquid crystal display constructed according to an embodiment 4–2 of the invention.

Except two points, the test cell used in the experiment for checking the spray to bend transition time of the liquid crystal display of the embodiment 4–2 is the same as that of the embodiment 4–1 in terms of the configuration and structure of mechanical parts; the method of producing a cell; used materials; and others. The first different point is that electrodes 310, 311 were formed so as to have an irregular configuration respectively, using a UV asher, ozone asher or UV/ozone asher, and alignment layers 312, 313 were then formed on the electrodes 310, 311 so that the alignment layers 312, 313 also have the irregular configuration respectively. The second different point is that the formation of the alignment layers was done by spin coating. The test cell thus prepared is called "test cell B".

As a comparative test cell, the foregoing test cell R1 was used. The time required for a transition from the spray alignment to the bend alignment throughout the electrode region was observed, when 45 Hz, 7V rectangular waves were applied to each of the test cells B and R1.

TABLE 3 shows the time required for a transition from the spray alignment to the bend alignment throughout the electrode region in each of the test cells B, R1 when 45 Hz, 7V rectangular waves were applied to these cells.

TABLE 3

| TEST CELL | TRANSITION TIME | NOTES |
| --- | --- | --- |
| B | –3 | Molecules on the surfaces were completely transited. |
| R1 | 20–30 | Molecules on the surfaces were completely transited. |

(unit: sec.)

As seen from TABLE 3, the transition time of the test cell R1 was 20 to 30 sec., whereas the transition time of the test cell B of the invention was quick, namely, no longer than 3 sec.

This test result is attributable to the following fact: As shown in FIG. 14, when the liquid crystal molecules within a liquid crystal layer 314 are aligned on the surfaces of the alignment layers 312, 313 having configurations which correspond to the irregular surface configurations of the electrodes 310, 311 attached to the inner faces of the substrates, an alignment state having various liquid crystal directors is taken as a spray state. As a result, marked asymmetry occurs in the spray alignment state, and by virtue of the synergistic effect of the asymmetry and the electric field, the liquid crystal directors become likely to be orthogonal to the substrate surfaces and therefore alignment layer surfaces of the test cell. Accordingly, the displacement of the liquid crystal directors proceeds extremely smoothly so that a high-speed spray to bend transition can be carried out.

Embodiment 4–3

Figure 15:
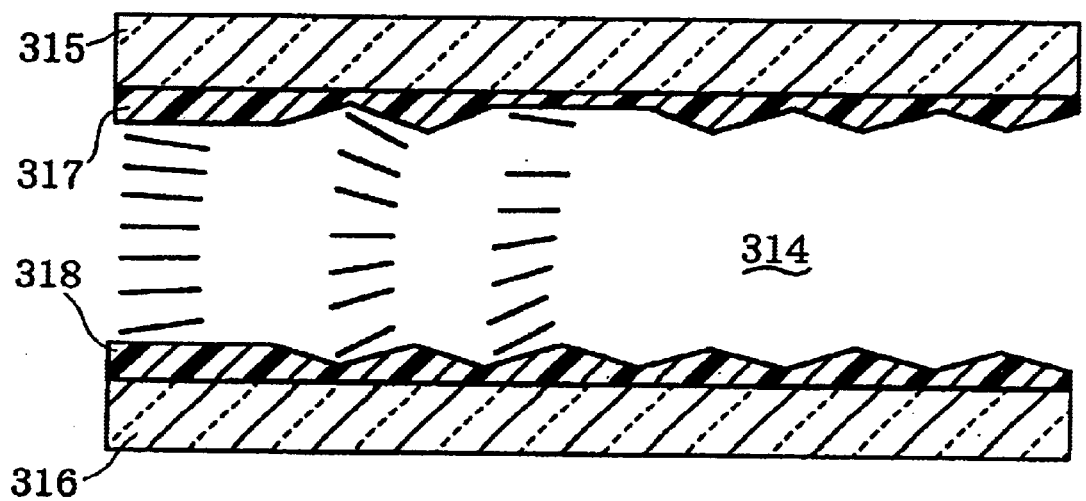
FIG. 15 conceptually shows the sectional structure of a test cell used in a liquid crystal display according to an embodiment 4-3 of the invention.

Except two points, the test cell used in the experiment for checking the spray to bend transition time of the liquid crystal display of the embodiment 4–3 is the same as the test cell B in terms of the configuration and structure of mechanical parts; the method of producing a cell; used materials; and others. The first different point is that as shown in FIG. 15, the substrate used in the embodiment 4–3 is an array substrate 316 having pixel electrodes and switching elements (not shown); flattening films 318, 317 are formed on the array substrate 316 and an opposed substrate 315 having an opposed electrode (not shown) respectively; and the flattening films 318, 317 each have an irregular configuration. The second different point is that like the test cell R2, a resinous letterpress printing plate having 300 screen lines was used.

For forming the irregular configurations of the surfaces of the flattening films 317, 318, the aforesaid UV asher, ozone asher or UV/ozone asher was used. The cell thus prepared is called "test cell C".

As a comparative test cell, the foregoing test cell R1 was used.

The time required for a transition from the spray alignment to the bend alignment throughout the electrode region was observed, when 45 Hz, 7V rectangular waves were applied to each of the test cells C and R1.

TABLE 4 shows the time required for a transition from the spray alignment to the bend alignment throughout the electrode region in each of the test cells C, R1 when 45 Hz, 7V rectangular waves were applied to these cells.

TABLE 4

| TEST CELL | TRANSITION TIME | NOTES |
| --- | --- | --- |
| C | –3 | Molecules on the surfaces were completely transited. |
| R1 | 20–30 | Molecules on the surfaces were completely transited. |

(unit: sec.)

As seen from TABLE 4, it took 20 to 30 sec. for the test cell R1 to finish a transition, while a transition was quickly done in 3 sec. in the test cell C.

Embodiment 4–4

Except two points, the test cell used in the experiment for checking the spray to bend transition time of the liquid crystal display of the embodiment 4–4 is the same as the test cell B in terms of the configuration and structure of mechanical parts; the method of producing a cell; used materials; and others. The first different point is that the used array substrate itself has an irregular configuration and a flattening film is formed on such a substrate. The second different point is that like the test cell R2, a resinous letterpress printing plate having 300 screen lines was used.

For forming the irregular configurations of the surfaces of the substrates, the aforesaid UV asher, ozone asher or UV/ozone asher was used. The cell thus prepared is called "test cell D".

For comparison, the foregoing test cell R1 was used.

The time required for a transition from the spray alignment to the bend alignment throughout the electrode region was observed, when 45 Hz, 7V rectangular waves were applied to each of the test cells C and R1.

TABLE 5 shows the time required for a transition from the spray alignment to the bend alignment throughout the electrode region in each of the test cells D, R1 when 45 Hz, 7V rectangular waves were applied to these cells.

TABLE 5

| TEST CELL | TRANSITION TIME | NOTES |
| --- | --- | --- |
| D | ~3 | Molecules on the surfaces were completely transited. |
| R1 | 20–30 | Molecules on the surfaces were completely transited. |

(unit: sec.)

As seen from TABLE 5, it took 20 to 30 sec. for transition in the test cell R1, while transition was quickly done in 3 sec. in the test cell D according to the invention.

Embodiment 4–5

Except one point, the test cell used in the experiment for checking the spray to bend transition time of the liquid crystal display of the embodiment 4–5 is the same as the test cell A in terms of the configuration and structure of mechanical parts; the method of producing a cell; used materials; and others. The different point is that the alignment layers were formed from an alignment film material in which powder, fine particles or the like were dispersed by printing or spin coating. More concretely, spacers were dispersed into the alignment film material in an amount of 3 wt % and a test cell was prepared by printing with a resinous letterpress printing plate having 300 screen lines. The cell thus prepared is called "test cell E".

For comparison, the foregoing test cell R1 was used.

The time required for a transition from the spray alignment to the bend alignment throughout the electrode region was observed, when 45 Hz, 7V rectangular waves were applied to each of the test cells E and R1.

TABLE 6 shows the time required for a transition from the spray alignment to the bend alignment throughout the electrode region in each of the test cells E, R1 when 45 Hz, 7V rectangular waves were applied to these cells.

TABLE 6

| TEST CELL | TRANSITION TIME | NOTES |
| --- | --- | --- |
| E | ~2 | Molecules on the surfaces were completely transited. |
| R1 | 20–30 | Molecules on the surfaces were completely transited. |

(unit: sec.)

As seen from TABLE R1, it took 20 to 30 sec. for the test cell R1 to finish a transition, while a transition was quickly done in 3 sec. in the test cell E of the invention.

Figure 16:
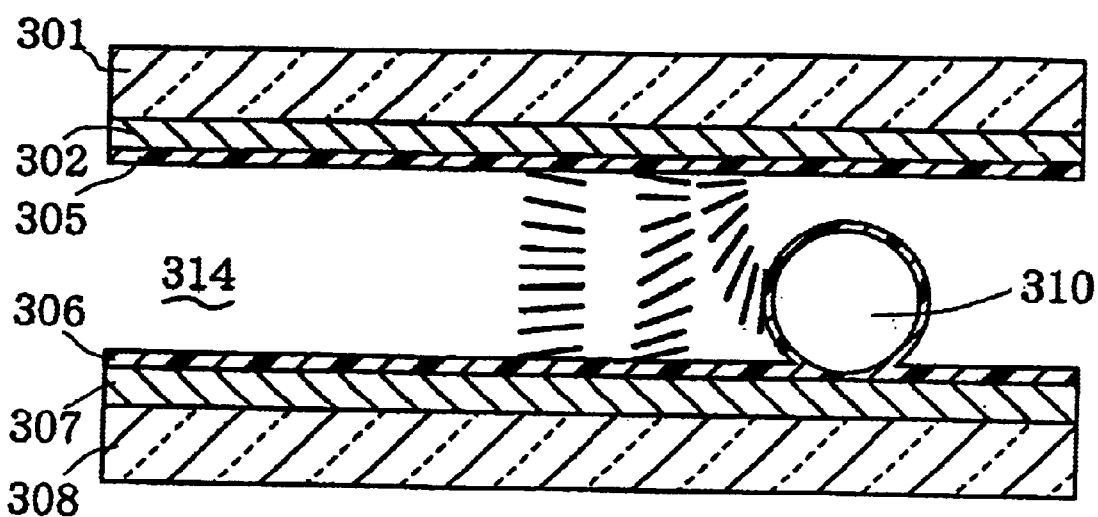
FIG. 16 conceptually shows the sectional structure of a test cell used in a liquid crystal display according to an embodiment 4-5 of the invention and shows a spray alignment state around a spacer.

This test result is attributable to the fact that as shown in FIG. 16, the liquid crystal molecules within the liquid crystal layer 314 are aligned along the surface of the scattered spacer 310 covered with the alignment layer, forming a region in which liquid crystal directors are perpendicular to the substrate 308. When applying an electric field to this region, the liquid crystal directors become likely to be perpendicular to the test cell substrate surfaces and therefore the alignment layer surfaces, by virtue of the synergistic effect of the above region serving as a core and the electric field. Accordingly, the displacement of the liquid crystal directors proceeds extremely smoothly, so that a high-speed spray to bend transition can be carried out.

It is apparent from the above description that the liquid crystal displays of this invention group enables high-speed, reliable spray to bend alignment transition without sacrificing the characteristics of the conventional OCB mode so that they have a wide range of practical applications.

Other Features Associated with the Fourth Invention Group

The fourth invention group has been described, but it is apparent that the invention is not limited to the above embodiments.

For instance, modifications may be made as follows:

(1) The invention may be applied not only to the OCB mode but also to liquid crystal displays of any other modes that require speeding up of the phase transition of the liquid crystal layer. The liquid crystal displays to which the invention is applied may be of any mode irrespective of the reflective type or transmissive type.

(2) In reflective type liquid crystal displays, the reflector itself has a special pattern of an irregular configuration for increasing a viewing angle, whiting and improving reflection brightness etc. Where the invention is applied to a reflective type liquid crystal display, the irregular configuration of the reflector may be utilized.

(3) The irregular configuration is not necessarily formed over the entire surface of each pixel, but may be present at part of the pixel. The bend state can develop from this part, expanding over the entire surface of the pixel. Therefore, the irregular configuration may be formed by use of several masks during the preparation of TFT. Of course, the formation of such a partial irregular configuration can also be carried out in any other process than the TFT preparation process.

(4) Formation of the irregular configurations on the alignment layer surfaces may be carried out by other methods than the above-described method in which the irregular configurations are formed by printing or spin coating, using an alignment film material including powder, fine particles or the like dispersed therein. The same effect as that of the above method can be achieved by the following process: spacers are scattered just after printing the alignment layers, and after provisional curing, the alignment film material is again coated. In addition, it is also possible to directly spray the alignment film material in which spacers are dispersed, using a wet-type applicator.

Embodiments of the Fifth Invention Group

The fifth invention group of the invention will be described below. This invention group is characterized in that, with the intention of quickly, reliably carrying out the spray to bend transition in every pixel, the liquid crystal molecules encapsulated in an OCB mode liquid crystal display have an "HAN alignment" at the adhering positions of spacers which an adhesive is applied to and the liquid crystal molecules are in contact with.

The invention will be hereinafter described according to its embodiments.

Embodiment 5–1

Figure 17:
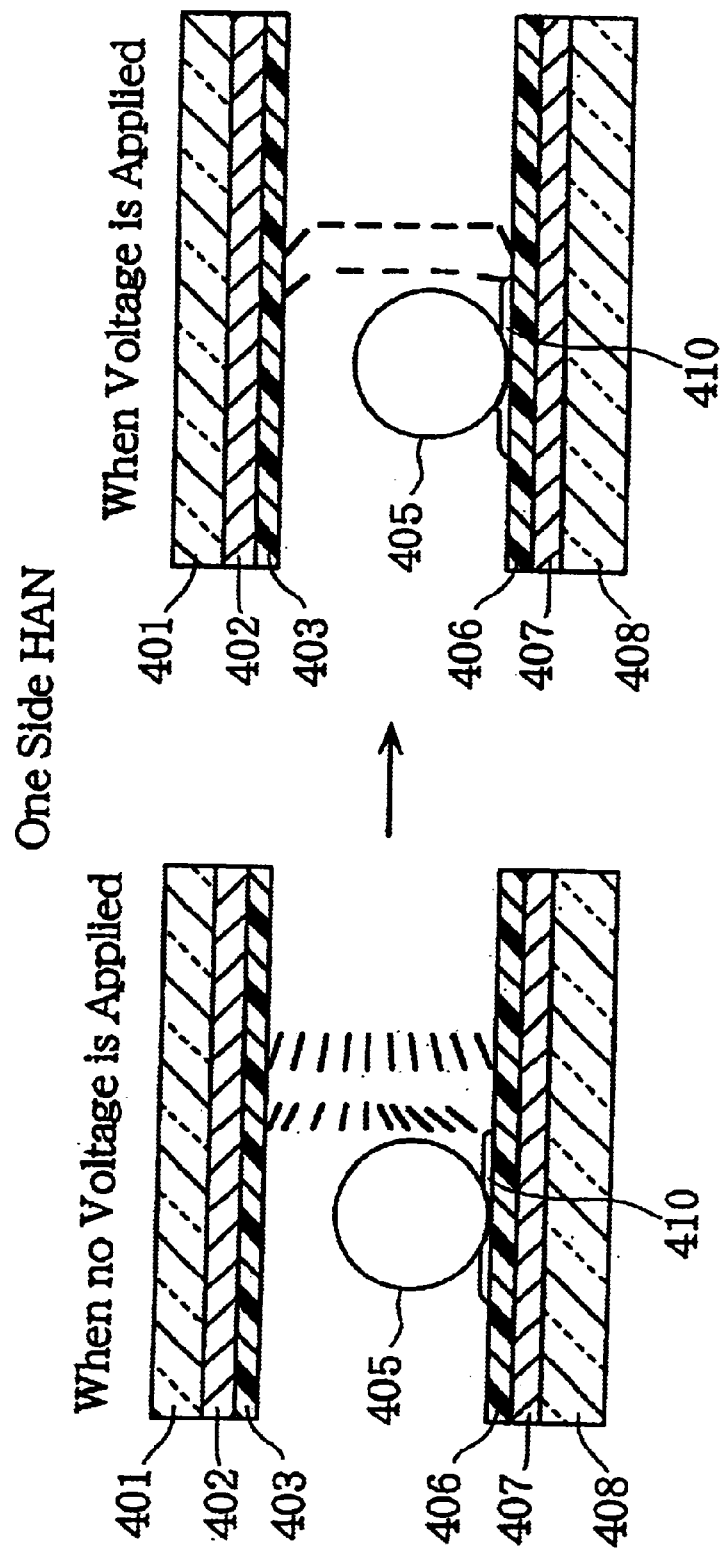
FIG. 17 conceptually shows the sectional structure of a test cell used in a liquid crystal display according to an embodiment 5-1 of the invention.

FIG. 17 conceptually illustrates the sectional structure of a test cell of a liquid crystal display constructed according to an embodiment 5–1 of the invention. Specifically, FIG. 17 shows a schematic sectional view of a test cell used in an experiment for checking the time taken for a spray to bend transition.

There will be explained a method of manufacturing the liquid crystal display of this embodiment. Firstly, Alignment Film Coating Material SE-7492 produced by Nissan Chemical Industries, Ltd. (solid components 6%) was applied onto two glass substrates 401, 408 having transparent electrodes 402, 407 respectively, by the spinner method and then cured in a thermostatic oven at a temperature of 180° C. for one hour, thereby forming alignment layers 403, 406.

Thereafter, the alignment layers 403, 406 were rubbed pixel by pixel, using a rubbing cloth made of rayon, and spacers 405 produced by Nippon Shokubai Co., Ltd. (2–3 μm Beads GPZ-60 coated with 25 wt % of an adhesive 410) were scattered on the glass substrate 408. Then, the cell was placed horizontally within a thermostatic oven at 180° C. for 10 minutes, thereby securely adhering the spacers 405 to the substrate 408. The adhesive 410 spread to the extent substantially equal to the diameter of the spacers 405.

The material of the adhesive 410 may have such a performance that allows the liquid crystal to be oriented in a vertical, high-tilt alignment on the surface of the adhesive 410. For example, fluorine or the like is introduced into the molecular structure of the adhesive 410 thereby enhancing the vertical alignment of the liquid crystal of the liquid crystal layer. It is also possible to mix the adhesive with a fluorine type alignment material, fluorine type material, or long chain alkyl type material.

Then, Structbond XN-21-S (the product name of a sealing resin produced by Mitsui Toatsu Chemical Co., Ltd.) was used as a sealing resin to adhere the glass substrates 401, 408 such that the gap between the substrates 401, 408 was 6.5 μm, whereby a liquid crystal cell was prepared.

Figure 18:
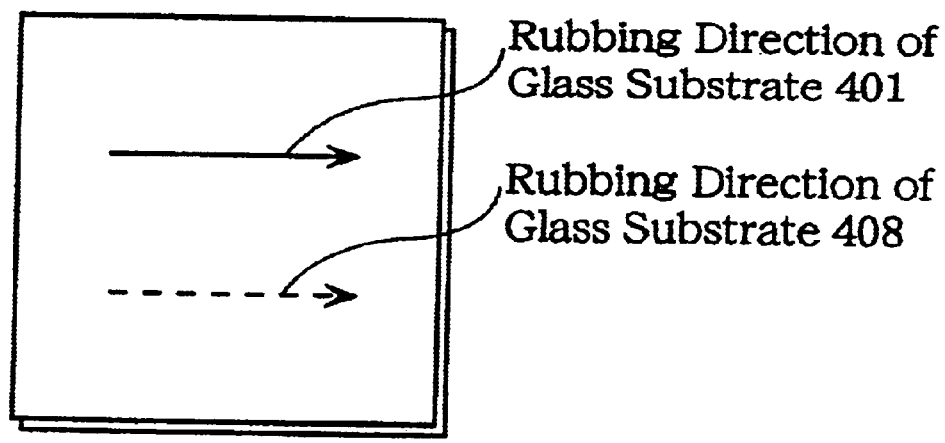
FIG. 18 is a conceptual view showing a rubbing direction of the liquid crystal display shown in FIG. 17.

In the above process, the upper side of one substrate and the lower side of the other substrate (see FIG. 17) were rubbed in the same direction as shown in FIG. 18.

Then, Liquid Crystal MJ96435 produced by Merck & Co., Inc. was introduced into the liquid crystal cell by vacuum injection and the cell was sealed with Sealing Resin 352A (the UV-hardenable type resin produced by Loctite Japan, Corp.).

Polarizers (not shown) were then attached to the substrates from above and below respectively such that the polarizing axes were at 45° with respect to the rubbing direction of the alignment layers and such that the polarizing axes cross each other at right angles, whereby a test cell was prepared. The cell thus prepared is called "test cell A".

For comparison, a test cell R having the same structure as the test cell of the embodiment 5–1 was produced in the same way as the embodiment 5–1, except that GPZ-60 coated with no adhesive was used. This cell is called "test cell R".

Then, the time required for a transition from the spray alignment to the bend alignment throughout the electrode region was observed, when 45 Hz, 7V rectangular waves were applied to each of the test cells A and R.

TABLE 7 shows the time required for a transition from the spray alignment to the bend alignment throughout the electrode region in each of the test cells A, R when 45 Hz, 7V rectangular waves were applied to these cells.

TABLE 7

| TEST CELL | TRANSITION TIME | NOTES |
| --- | --- | --- |
| A | –4 | Bend transition cores developed from spacer portions and transition was completed in an instant. |
| R | 20–30 | A few bend transition cores developed randomly and complete transition took time. |

(unit: sec.)

As seen from TABLE 7, the transition time of the test cell R was 20 to 30 sec., whereas the transition time of the test cell A was quick, that is, no longer than 4 sec.

The above result is attributable to the following fact: In the condition shown in FIG. 17, the liquid crystal molecules spuriously increase in their pretilt angle within the regions that are not the alignment layer regions but the adhesive regions. That is, the spurious one-side HAN alignment causes asymmetry in the spray alignment state, and the synergistic effect of the asymmetry and the electric field makes the liquid crystal directors more likely to be orthogonal to the test cell substrate surfaces and the alignment layer surfaces. Therefore, the displacement of the liquid crystal directors proceeds extremely smoothly so that a high-speed spray to bend transition can be carried out.

TABLE 8 shows a change in the transition time of each cell when 45 Hz, 5V rectangular waves were applied in the similar voltage application test.

TABLE 8

| TEST CELL | TRANSITION TIME | NOTES |
| --- | --- | --- |
| A | –30 | Bend transition cores developed from spacer portions. Transition was completed but speed was slow. |
| R | 420– | The number of developed transition cores was extremely small. Non-transited portions were left. |

(unit: sec.)

As seen from TABLE 8, the transition time of the test cell R was about 400 sec. Non-transited molecules were left within this transition time and the transition would not proceed further. In contrast to this, a transition quickly occurred and finished in 30 sec. in the test cell A.

Embodiment 5–2

Figure 19:
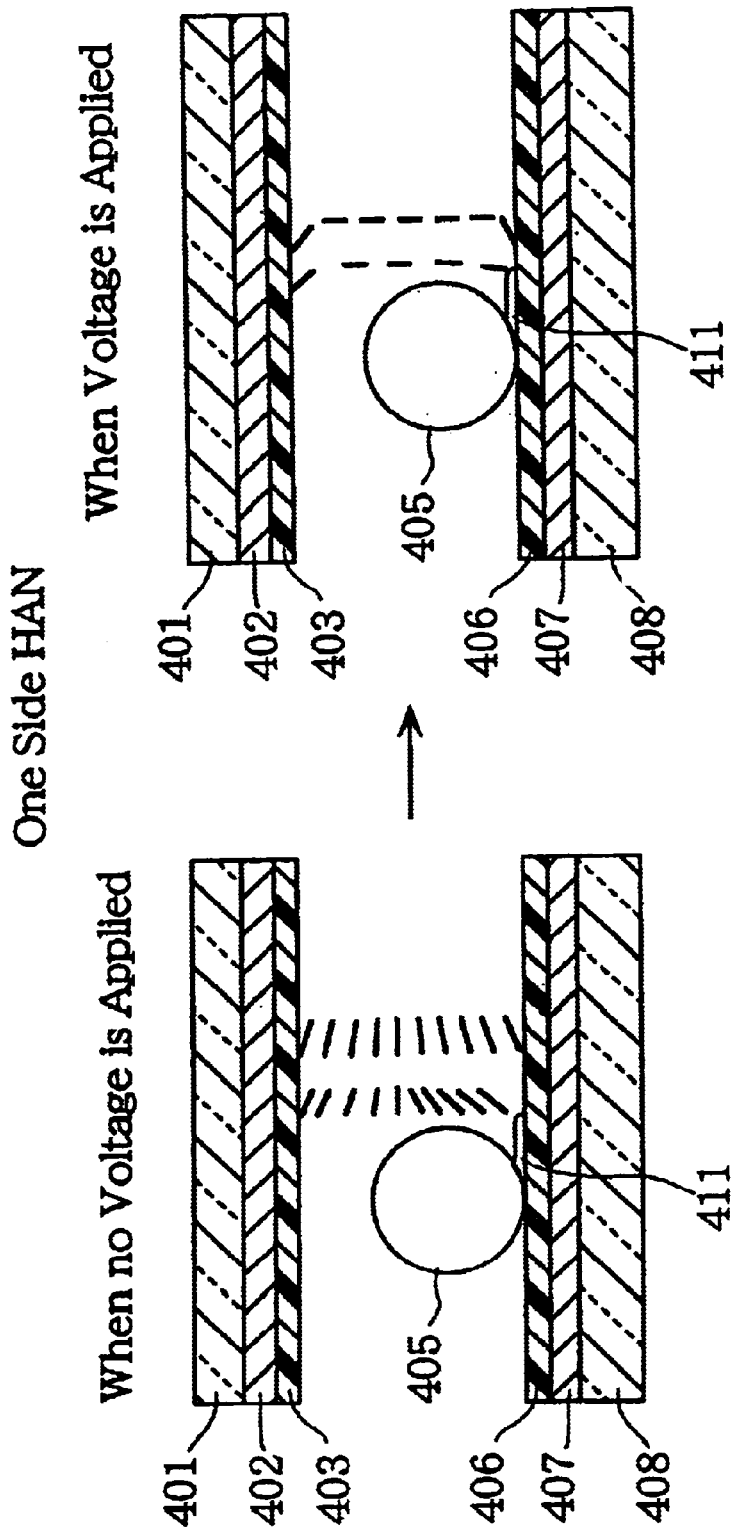
FIG. 19 conceptually shows the sectional structure of a test cell used in a liquid crystal display according to an embodiment 5-2 of the invention.

Except one point, the test cell used in the experiment for checking the spray to bend transition time of the liquid crystal display of the embodiment 5–2 is the same as that of the embodiment 5–1 in terms of the configuration and structure of mechanical parts; the method of producing a cell; used materials; and others. The different point is that the cell was not horizontally but vertically placed in the thermostatic oven at 180° C. for 10 minutes thereby securely attaching the spacers 405 to the substrate 408, so that, as shown in FIG. 19, an adhesive 411 spread from either side of each spacer 405 to the extent substantially equal to the radius of the spacer 405. The cell thus prepared is called "test cell B".

For comparison, the test cell A of the embodiment 4–1 was used. The time required for a transition from the spray alignment to the bend alignment throughout the electrode region was observed, when 45 Hz, 7V rectangular waves were applied to each of the test cells A and B.

TABLE 9 shows the time required for a transition from the spray alignment to the bend alignment throughout the electrode region in each of the test cells A, B when 45 Hz, 7V rectangular waves were applied to these cells.

TABLE 9

| TEST CELL | TRANSITION TIME | NOTES |
|---|---|---|
| A | –4 | Molecules on the surfaces were completely transited. |
| B | –4 | Molecules on the surfaces were completely transited. |

(unit: sec.)

It is apparent from TABLE 9 that the transition time was within 4 sec. in both of the test cells A, B. The reason for this is that the area of the one-side HAN alignment when the cell is horizontally placed and the adhesive is spread uniformly with respect to the contact point between each spacer and the substrate is substantially the same as that when the cell is vertically placed and the adhesive is spread non-uniformly with respect to the same. Accordingly, a smooth spray to bend transition can be carried out in this embodiment.

Embodiment 5–3

Figure 20:
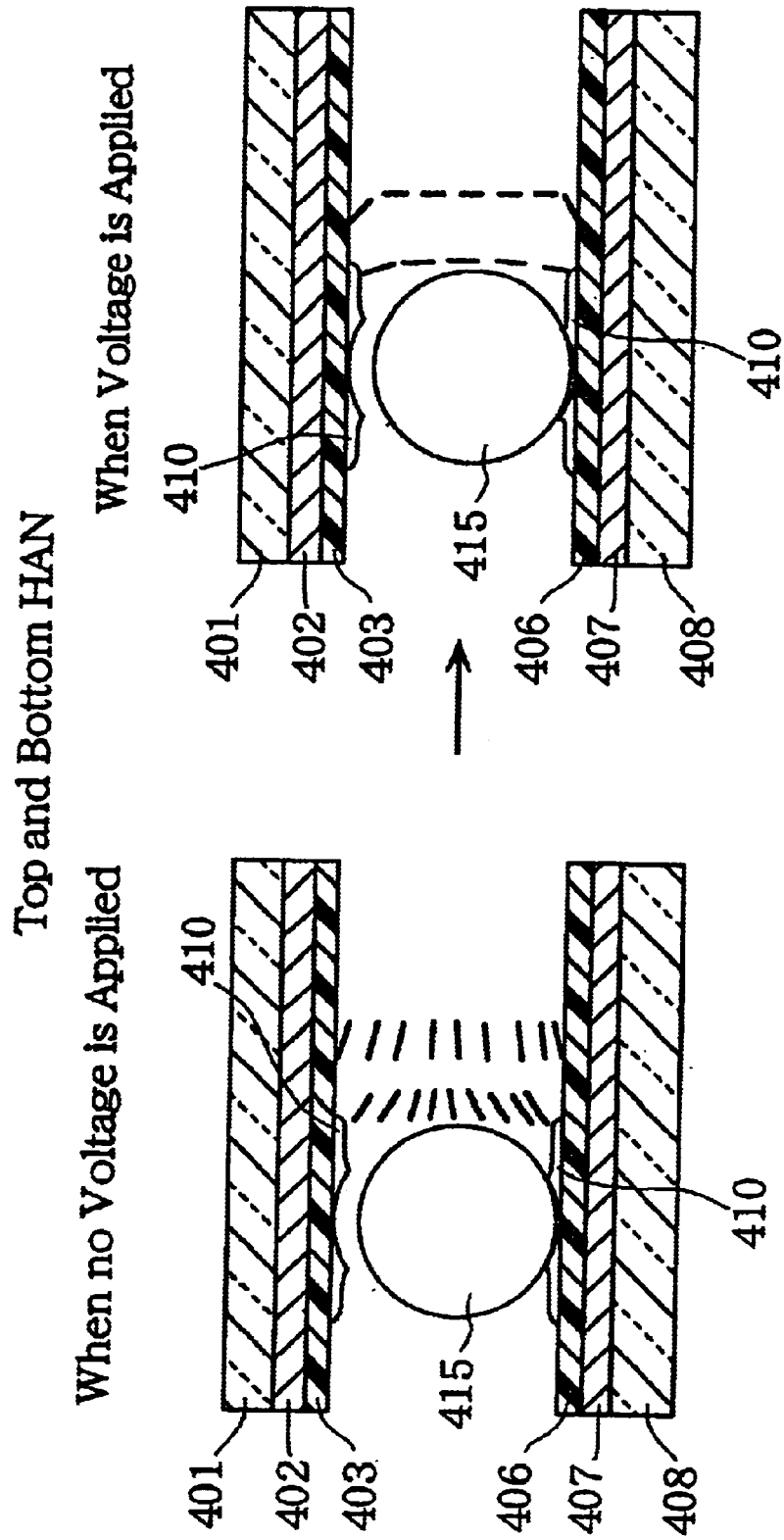
FIG. 20 conceptually shows the sectional structure of a test cell used in a liquid crystal display according to an embodiment 5-3 of the invention.
Figure 21:
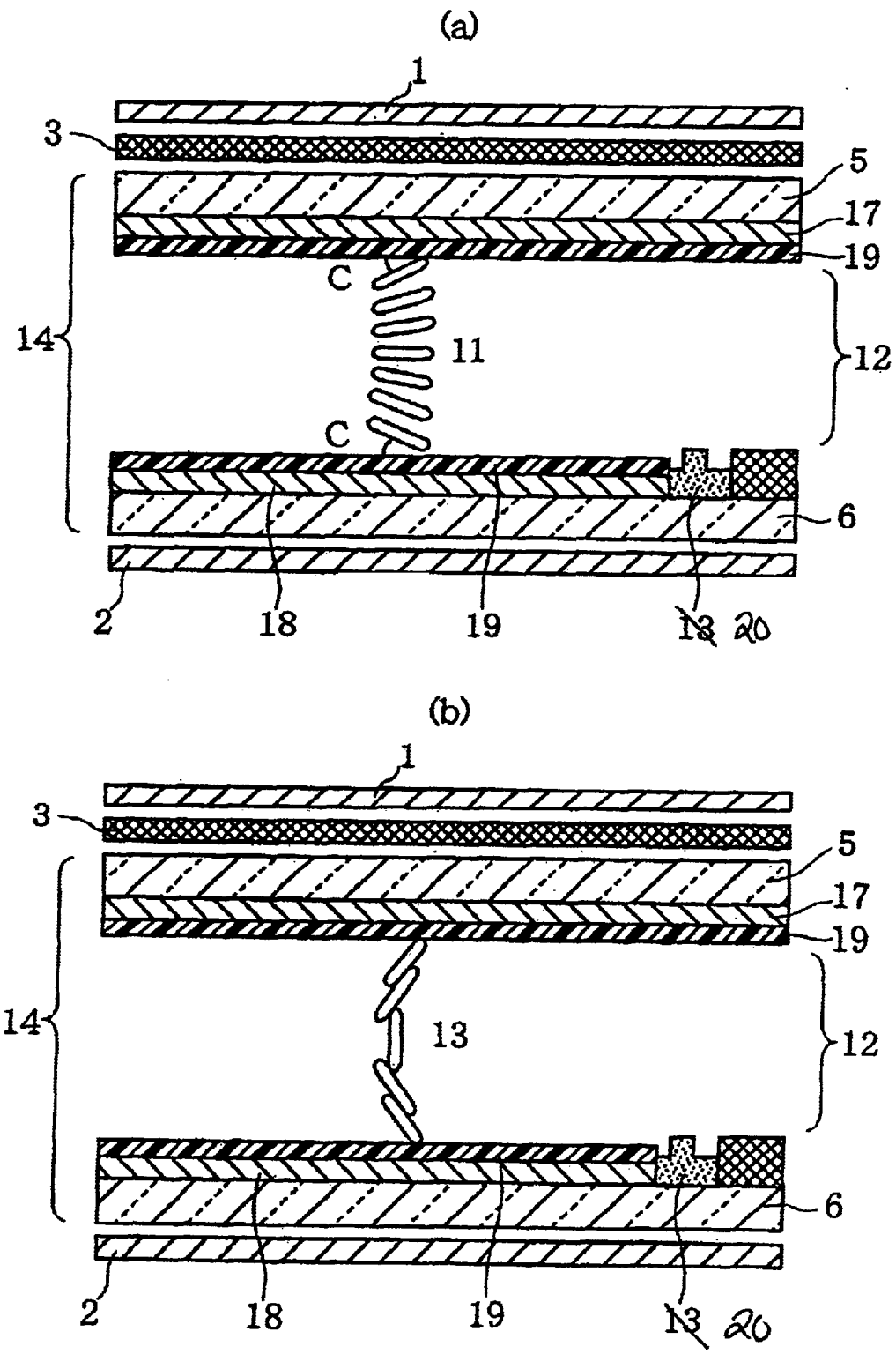
FIG. 21 is a conceptual structural view of a conventional liquid crystal display.

FIG. 20 conceptually illustrates the sectional structure of a test cell for a liquid crystal display constructed according to an embodiment 5–3 of the invention.

Except two points, the test cell used in the experiment for checking the spray to bend transition time of the liquid crystal display of the embodiment 5–3 is the same as the test cell A in terms of the configuration and structure of mechanical parts; the method of producing a cell; used material; and others. The first different point is that spacers 415 having a diameter of 5 μm were used for gap formation as well. The second different point is that the upper and lower substrates 401, 408 were overlaid and the adhesive 410 was spread over the upper and lower substrates 401, 408 while the substrates 401, 408 being brought into contact with the spacers 415. The cell thus prepared is called "test cell C".

For comparison, the test cell A of the embodiment 5–1 was used. The time required for a transition from the spray alignment to the bend alignment throughout the electrode region was observed, when 45 Hz, 7V rectangular waves were applied to each of the test cells C and A.

TABLE 10 shows the time required for a transition from the spray alignment to the bend alignment throughout the electrode region in each of the test cells C, A when 45 Hz, 7V rectangular waves were applied to these cells.

TABLE 10

| TEST CELL | TRANSITION TIME | NOTES |
|---|---|---|
| C | –2 | Molecules on the surfaces were completely transited. |

TABLE 10-continued

| TEST CELL | TRANSITION TIME | NOTES |
|---|---|---|
| A | –4 | Molecules on the surfaces were completely transited. |

(unit: sec.)

It is apparent from TABLE 10 that the transition time of the test cell A was within 4 sec., whereas the transition time of the test cell C was quicker, that is, no longer than 2 sec. The reason for this is that while the embodiments 5–1 and 5–2 respectively had a spurious one-side HAN alignment, a top/bottom HAN alignment occurred in the embodiment 5–3 so that the spray to bend transition could be further speeded up.

Additionally, in the liquid crystal display of the embodiment 5–3, a spurious HAN alignment could be formed simultaneously with the formation of the gap between the substrates by the spacers, so that the manufacturing process could be simplified, leading to a low cost process.

It will be understood from the above description that the liquid crystal displays of the fifth invention group enable high-speed, reliable spray to bend alignment transition without sacrificing the characteristics of the conventional OCB mode, so that they have a wide range of practical applications.

Other Features Associated with the Fifth Invention Group

The fifth invention group of the invention has been described according to several embodiments, but it is apparent that the fifth invention group is not limited to the above embodiments.

For instance, modifications may be made as follows:

(1) Although the spread of the adhesive is set to be approximately equal to the diameter of the spacers in the foregoing embodiments, it may be smaller than the diameter of the spacers or alternatively may exceed it. As the adhesive spreads more, the region of the HAN alignment is more expanded, so that the alignment transition can be more easily carried out.

(2) The fifth invention group is applicable not only to the OCB mode but also to liquid crystal displays of any modes that require speeding up of the phase transition of the liquid crystal layer. In addition, the liquid crystal displays to which this group is applicable may be of any mode irrespective of the reflective type or transmissive type.

(3) By weakening or eliminating part of the aligning function of the substrate surfaces which have undergone alignment treatment beforehand, the speeding up of the bend transition in the invention can be achieved. Accordingly, any techniques may be utilized as far as such an arrangement can be achieved.

(4) Where a liquid crystal display is made by use of substrates prepared by forming a column-like configuration on a resist by photolithography, a similar bend transition develops from the aggregate parts. Accordingly, the formed configuration itself may have a structure or arrangement that impairs rubbing.

Industrial Applicability

As has been described earlier, the object of the invention can be satisfactorily accomplished by the configurations proposed by the invention.

Specifically, the invention provides a liquid crystal display which comprises a pair of substrates and a liquid crystal layer sandwiched between the pair of substrates; wherein where the alignment state of a liquid crystal when no voltage is applied to the crystal layer is defined as an alignment state 1 and the alignment state of the liquid crystal used for performing displaying is defined as an alignment state 2, the alignment state 1 differs from the alignment state 2; and wherein the interface between the liquid crystal layer and at least one of the pair of substrates is flattened, whereby a reliable, fast transition can be carried out and display defects can be eliminated and whereby high response speed, a wide viewing angle and high picture quality can be achieved.

The invention also provides an active matrix type liquid crystal display wherein a liquid crystal layer is sandwiched between an array substrate having pixel electrodes and an opposed substrate having an opposed electrode and displaying is performed by orienting the liquid crystal layer in a bend alignment; and wherein conductive formation members electrically conducted to the opposed electrode are formed on the opposed substrate, being electrically insulated from the array substrate, so that a diagonal strong electric field is developed and applied across the electrically conductive formation members and the pixel electrodes, causing an electric field distortion which makes the distortion energy of the liquid crystal molecules within the liquid crystal layer positioned in the vicinity of the electrically conductive formation members and in the vicinity of the pixel electrodes higher than the surroundings, so that, by applying high voltage across the pixel electrodes and the opposed electrode in the above condition, transition cores of the bend alignment can be developed and the regions of the bend alignment can be expanded.

The invention also provides a liquid crystal display which comprises a pair of substrates having electrodes and a liquid crystal layer sandwiched between the pair of substrates; wherein liquid crystal molecules within the liquid crystal layer are oriented in a bend alignment to perform displaying; and wherein at least one conductive particle having a diameter smaller than the space between the pair of substrates is placed on the electrode surface of at least either one of the substrates, thereby causing electric field concentration in the conductive particle so that transition cores of the bend alignment can be developed and the bend alignment regions can be expanded by continuous application of high voltage.

The invention provides another liquid crystal display which comprises a pair of substrates having electrodes and a liquid crystal layer sandwiched between the pair of substrates; wherein the liquid crystal layer is oriented in a spray alignment; and wherein the surfaces of the alignment layers formed on the surfaces of the electrodes respectively have an irregular configuration so that the pretilt angle of liquid crystal molecules within the liquid crystal layer spuriously increases owing to regions which vary in alignment layer thickness and as a result, a shift to the bend alignment can be quickly carried out during initialization of a spray to bend transition.

The invention further provides a liquid crystal display which comprises a pair of substrates having electrodes and a spray-aligned liquid crystal layer sandwiched between the pair of substrates, wherein a plurality of spacers are placed between the pair of substrates, wherein the spacers are securely attached to at least one of the substrates with an adhesive which increases the pretilt angle of liquid crystal molecules within the liquid crystal layer, and wherein the adhesive is spread over the substrate, so that the pretilt angle of the liquid crystal molecules spuriously increases in every spacer region owing to regions where said at least one of the pair of substrates differs from the other substrate and as a result, a transition to the bend alignment can be quickly carried out during initialization of a spray to bend transition.

What is claimed is:

1. A liquid crystal display comprising:
   a first substrate having a pixel electrode;
   a second substrate having an opposed electrode;
   a liquid crystal layer sandwiched between the first substrate and the second substrate and transitioned from a splay alignment to a bend alignment by applying a voltage between the pixel electrode and the opposed electrode;
   a first alignment layer provided between the first substrate and the liquid crystal layer; and
   a second alignment layer provided between the second substrate and the liquid crystal layer;
   wherein at least either of the first alignment layer or the second alignment layer is an irregular alignment layer formed by letterpress printing wherein a region of a surface of the irregular alignment layer above the pixel electrode has an irregular configuration, the surface of the first alignment layer being on a side of the liquid crystal layer.

2. A liquid crystal display comprising:
   a first substrate having a pixel electrode;
   a second substrate having an opposed electrode;
   a liquid crystal layer sandwiched between the first substrate and the second substrate and transitioned from a splay alignment to a bend alignment by applying a voltage between the pixel electrode and the opposed electrode;
   a first alignment layer provided between the first substrate and the liquid crystal layer; and
   a second alignment layer provided between the second substrate and the liquid crystal layer; wherein
   (1) at least either of the first alignment layer or the second alignment layer is an irregular alignment layer wherein a region of a surface above the pixel electrode has an irregular configuration, the surface of the first alignment layer being on a side of the liquid crystal layer;
   (2) an electrode on which the irregular alignment layer is provided is an irregular electrode wherein a surface of the irregular electrode on a side of the liquid crystal layer has an irregular configuration, the electrode being either of the pixel electrode of the first substrate or the opposed electrode of the second substrate; and
   (3) a pattern of the irregular configuration of the irregular alignment layer corresponds to the irregular configuration of the irregular electrode.

3. A method of manufacturing a liquid crystal comprising a first substrate having a pixel electrode, a second substrate having an opposed electrode, a liquid crystal layer sandwiched between the first substrate and the second substrate and transitioned from a splay alignment to a bend alignment by applying a voltage between the pixel electrode and the opposed electrode, a first alignment layer provided between the first substrate and the liquid crystal layer, and a second alignment layer provided between the second substrate and the liquid crystal layer, wherein at least either of the first alignment layer or the second alignment layer is an irregular alignment layer wherein a region of a surface of the irregular alignment layer above the pixel electrode has an irregular configuration, the surface of the first alignment layer being on a side of the liquid crystal layer, the method comprising:

forming an electrode irregular configuration on a surface of an electrode on which the irregular alignment layer is to be provided, the electrode being either of the pixel electrode of the first substrate or the opposed electrode of the second substrate, by use of a UV usher, ozone usher, or UV/ozone usher; and forming the irregular alignment layer having the irregular configuration with a pattern corresponding to a pattern of the electrode irregular configuration by applying a material of the irregular alignment layer on the electrode having the electrode irregular configuration.

4. A method of manufacturing a liquid crystal display comprising a first substrate having a pixel electrode, a second substrate having an opposed electrode, a liquid crystal layer sandwiched between the first substrate and the second substrate and transitioned from a splay alignment to a bend alignment by applying a voltage between the pixel electrode an the opposed electrode, a first alignment layer provided between the first substrate and the liquid crystal layer, and a second alignment layer provided between the second substrate and the liquid crystal layer, wherein at least either of the first alignment or the second alignment layer is an irregular alignment layer wherein a region of a surface of the irregular alignment layer above the pixel electrode has an irregular configuration, the surface of the first alignment layer being on a side of the liquid crystal layer, the method comprising:

adjusting a material of the irregular alignment layer by dispersing powder or fine particles into a printing varnish; and forming the irregular alignment layer having the irregular configuration corresponding to a disposition of the powder or the fine particles by applying the material of the irregular alignment on a surface of either of the pixel electrode or the opposed electrode.

5. A liquid crystal display comprising:
a first substrate having a pixel electrode;
a second substrate having an opposed electrode;
a liquid crystal layer sandwiched between the first substrate and the second substrate and transitioned from a splay alignment to a bend alignment by applying a voltage between the pixel electrode and the opposed electrode;
a first alignment layer provided between the first substrate and the liquid crystal; and
a second alignment layer provided between the second substrate and the liquid crystal layer; wherein
(1) at least either of the first alignment layer or the second alignment layer is an irregular alignment layer wherein a region of a surface of the irregular alignment layer above the pixel electrode has an irregular configuration, the surface of the first alignment layer being on a side of the liquid crystal layer; and
(2) in the irregular configuration of the irregular alignment layer, a largest level difference between a highest portion and a lowest portion is larger than a smallest thickness of the irregular alignment layer but smaller than an average thickness of the liquid crystal layer.

6. A liquid crystal display according to claim 5, wherein the largest level difference is larger than 0.1 $\mu$m but smaller than 0.7 $\mu$m.

7. A liquid crystal display comprising:
a first substrate having a pixel electrode;
a second substrate having an opposed electrode;
a liquid crystal layer sandwiched between the first substrate and the second substrate and transitioned from a splay alignment to a bend alignment by applying a voltage between the pixel electrode and the opposed electrode;
a first alignment layer provided between the first substrate and the liquid crystal layer; and
a second alignment layer provided between the second substrate and the liquid crystal; wherein
(1) at least either of the first alignment layer or the second alignment layer is an irregular alignment layer wherein a region of a surface of the irregular alignment layer above the pixel electrode has an irregular configuration, the surface of the first alignment layer being on a side of the liquid crystal layer; and
(2) at least either of the first alignment or the second alignment layer comprises powder or fine particles, and a pattern of the irregular configuration corresponds to a disposition of the powder or the fine particles.

* * * * *

UNITED STATES PATENT AND TRADEMARK OFFICE
CERTIFICATE OF CORRECTION

PATENT NO. : 6,710,832 B2  
DATED : March 23, 2004  
INVENTOR(S) : Katsuji Hattori et al.

It is certified that error appears in the above-identified patent and that said Letters Patent is hereby corrected as shown below:

Title page,  
Item [63], after "March 28, 2001" insert -- which is a national stage application of PCT/JP00/05128, now U.S. Patent No. 6,515, 725 issued February 4, 2003." --

Column 34,  
Line 46, after "a surface" insert -- of the irregular alignment layer --.

Column 35,  
Line 24, "an" should be changed to -- and --.  
Line 29, after "alignment" (first occurrence) insert -- layer --.

Column 36,  
Line 2, after "crystal" insert -- layer --.

Signed and Sealed this

Fifteenth Day of March, 2005

JON W. DUDAS  
*Director of the United States Patent and Trademark Office*

UNITED STATES PATENT AND TRADEMARK OFFICE
CERTIFICATE OF CORRECTION

PATENT NO. : 6,710,832 B2  
DATED : March 23, 2004  
INVENTOR(S) : Katsuji Hattori et al.

Page 1 of 1

It is certified that error appears in the above-identified patent and that said Letters Patent is hereby corrected as shown below:

Title page,  
Item [63], Related U.S. Application Data, after "March 28, 2001" insert -- which is a national stage application of PCT/JP00/05128, now U.S. Patent No. 6,515,725 issued February 4, 2003. --

Column 34,  
Line 46, after "a surface" insert -- of the irregular alignment layer --.

Column 35,  
Line 24, "an" should be change to -- and --.  
Line 29, after "alignment" (first occurrence) insert -- layer --.

Column 36,  
Line 2, after "crystal" insert -- layer --.

Signed and Sealed this

Seventh Day of June, 2005

JON W. DUDAS  
*Director of the United States Patent and Trademark Office*